(12) United States Patent
Mehara et al.

(10) Patent No.: US 6,279,367 B1
(45) Date of Patent: Aug. 28, 2001

(54) MULTIPLE BAR STRAIGHTENING AND CUTTING SYSTEM IN BAR STEEL ROLLING LINE

(75) Inventors: Akio Mehara; Koji Mizuno; Soichi Aoyama, all of Yokohama (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/402,011

(22) PCT Filed: Jan. 27, 1999

(86) PCT No.: PCT/JP99/00326

§ 371 Date: Sep. 28, 1999

§ 102(e) Date: Sep. 28, 1999

(87) PCT Pub. No.: WO99/38637

PCT Pub. Date: Aug. 5, 1999

(30) Foreign Application Priority Data

| Feb. 2, 1998 | (JP) | 10-021156 |
|---|---|---|
| Feb. 2, 1998 | (JP) | 10-021157 |
| Feb. 2, 1998 | (JP) | 10-021159 |
| Feb. 16, 1998 | (JP) | 10-033266 |

(51) Int. Cl.⁷ .................................................. B21B 1/00
(52) U.S. Cl. ........................ 72/203; 72/11.1; 72/160; 72/250
(58) Field of Search .................. 72/203, 8.3, 8.8, 72/11.1, 11.5, 160, 250

(56) References Cited

U.S. PATENT DOCUMENTS 3,381,589  5/1968  Peddinghaus .
4,635,512  1/1987  Wengenroth et al. .
4,945,751 * 8/1990  Ireland ................................... 72/332

FOREIGN PATENT DOCUMENTS

| 2150542 | 4/1973 | (DE) . |
|---|---|---|
| 2343546 | 10/1977 | (FR) . |
| 50-64287 | 10/1973 | (JP) . |
| 58-132414 | 8/1983 | (JP) . |
| 61-92432 | 6/1986 | (JP) . |
| 62-42920 | 3/1987 | (JP) . |
| 64-56920 | 4/1989 | (JP) . |
| 2-262908 | 10/1990 | (JP) . |
| 2-262909 | 10/1990 | (JP) . |
| 5-116021 | 5/1993 | (JP) . |
| 2616365 | 3/1997 | (JP) . |
| 9-136213 | 5/1997 | (JP) . |

* cited by examiner

Primary Examiner—Ed Tolan
(74) Attorney, Agent, or Firm—Frishauf, Holtz, Goodman, Langer & Chick, P.C.

(57) ABSTRACT

A multiple section bars straightening/cutting system in a bar rolling line comprises a multiple section bars straightening apparatus, an inlet side introduction pinch roller, a multiple traveling section bars cutting apparatus and a rear surface tilting table having an outlet side introduction pinch roller. The multiple traveling section bars cutting apparatus includes a fixed blade and a moving blade each having a plurality of calipers formed in accordance with the cross-sectional shapes of the section bars. The rear tilting table tilts in the direction in which the blades of the multiple traveling section bars cutting apparatus move in synchronism with the movement of the blades.

12 Claims, 32 Drawing Sheets

ANGLE BAR     CHANNEL BAR     H(I) SECTION BAR

VARIABLE PITCH

PRODUCT (a)                    (b)

(a)     (b)

(a)  (b)

(a)  (b)

ANGLE BAR (a)  CHANNEL BAR (b)  H(I) SECTION BAR (c)

A-A SECTION

SECTION BAR

SECTION BAR

FIG. 51
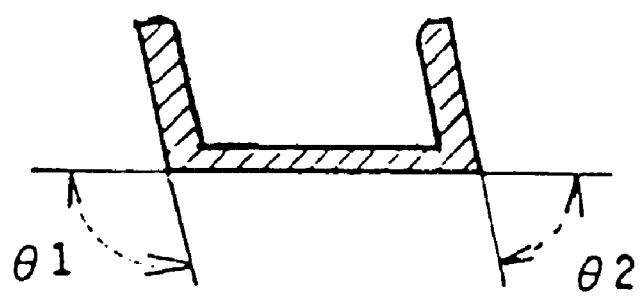
(a) $\theta 1 > 90° > \theta 2$
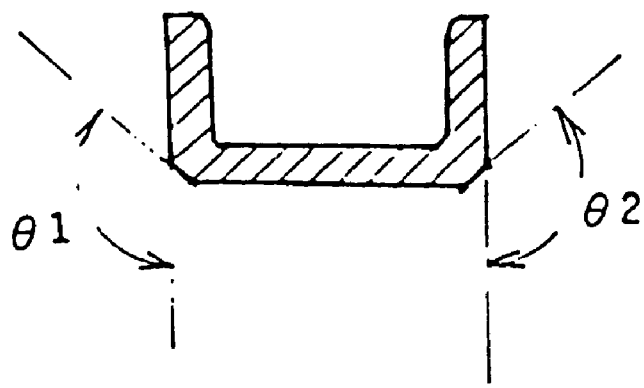
(b) $\theta 1 > 90°$, $\theta 2 > 90°$

MULTIPLE BAR STRAIGHTENING AND CUTTING SYSTEM IN BAR STEEL ROLLING LINE

TECHNICAL FIELD

The present invention relates to a multiple section bars straightening/cutting system in a rolling mill.

BACKGROUND ART

Section bars rolled in a rolling mill ordinarily have a length of several tens to several hundreds of meters. The products having been rolled are divided into products having a suitable length in accordance with the length of a cooling bed so as to be supplied to a next cooling process and cooled. The divided products having been cooled are cut and corrected again sometimes offline. Dominant in modern rolling mills, however, is a method of straightening the cooled products inline downstream of the cooling process and cutting them to a product length.

FIG. 36 is a view explaining the outline of an ordinary inline straightening/traveling cutting system in a section bar rolling line. In FIG. 36, numeral 51 denotes a multiple section bars straightening apparatus disposed to the outlet side of a cooling bed, numeral 52 denoted an inter-machine table, numeral 53 denotes a first measuring roll disposed downstream of the multiple section bars straightening apparatus 51, and numeral 54 denotes a presser roller 54 disposed downstream of the first measuring roll 53 for pressing a section bar coming off the multiple section bars straightening apparatus 51 against the inter-machine table 52.

Numeral 55 denotes a traveling cutting machine disposed downstream of the presser roller 54 and numeral 56 denotes a second measuring roll 56 disposed downstream of the traveling cutting machine 55. Numeral 57 denotes an outlet side presser roller 57 disposed downstream of the second measuring roll 56 and numeral 58 denotes a rear surface tilting table 58 disposed downstream of the outlet side presser roller 57.

Further, (a), (b) and (c) in FIG. 36 time-sequentially show the tail end of a section bar to be corrected and cut, wherein (a) shows (n–2) cut which is 2 cuts before final cut (n cut), (b) shows (n–1) cut which is 1 cut before the final cut (n cut) and (c) shows the final cut (n cut), respectively. Note that a product length is shown by L and a tail end block length is shown by 1c.

Next, a cutting job for the tail end portion of a section bar will be described based on FIG. 36.

In the state of the (n–2) cut shown in (a), the section bar is restricted by the multiple section bars straightening apparatus 51 and fed downstream, cut to the product length L by the traveling cutting machine 55 and the length of the remaining portion thereof is made to 2L+lc. Note that, the rear surface tilting table is tilted in a cutting direction so that the section bar is not bent while it is cut.

In the state of (n–1) cut shown in (b), the section bar is still restricted by the multiple section bars straightening apparatus 51 and the length of the remaining portion after it is cut by the traveling cutting machine 55 is made to L+lc.

Thereafter, since the tail end of the section bar comes off the multiple section bars straightening apparatus 51 before it is subjected to n cut, first, the section bar is fed downstream while being synchronized with the multiple section bars straightening apparatus 51 in the state that it is pressed against the inter-machine table 52 by the presser roller 54 before it comes off the multiple section bars straightening apparatus 51. After the section bar comes off the multiple section bars straightening apparatus 51, it is fed downstream by the restricting force of only the inlet side presser roller 54.

Then, as soon as the leading edge of a finally cut product (length: L+lc) is fed up to the position of the outlet side presser roller 57, it is pressed against the rear surface tilting table 58 by the outlet side presser roller 57 and subjected to the final n cut.

A reason why the section bar is restricted by the inlet side presser roller 54 and the outlet side presser roller 57 will be described.

The section bar having come off the multiple section bars straightening apparatus 51 is disposed such that it can be conveyed by the inter-machine table 52 and the rear surface tilting table 58. However, the feed velocities of multiple section bars cannot be similarly controlled when they are conveyed by the inter-machine table 52 and the rear surface tilting table 58 and a difference of velocities is caused between respective section bars having come off the multiple section bars straightening apparatus 51 and disposed in parallel with each other. Accordingly, it is very difficult to perform the n cut thereto within tolerance. To cope with this problem, the section bars having come off the multiple section bars straightening apparatus 51 are restricted by the inlet side presser roller 54 and the outlet side presser roller 57 so that the difference (delay) of velocities is not caused between the respective section bars disposed in parallel with each other.

As described above, means for feeding multiple section bars while restricting them are required upstream and downstream of the traveling cutting machine 55 to accurately cut them to the final cut (n).

In contrast, in order to prevent the bending of a section bar when it is cut while being restricted, the leading end of the section bar must be moved in the same direction as that in which a blade moves when it is cut. For this purpose, the rear surface tilting table 58 is installed.

FIG. 37 shows a specific example of the inline straightening/traveling cutting system for explaining a system employed in a company A. In FIG. 37, the portions having the same functions as those of FIG. 36 are denoted by the same numerals. Arrangements characteristic to the system will be specifically described based on FIG. 37.

First, a traveling cutting machine 55 will be described. The traveling cutting machine 55 employed by the company A is called a crank type shear. The crank type shear has a pair of crank shafts disposed above and below a pass line of a product. Crank arms are rotatably engaged with the crank shafts. The crank arms are formed to key shapes which are opposite to each other and execute operations at the upper end and the lower ends thereof. Then, an end of the key-shaped crank arm has a blade holder formed thereat on which a blade is mounted and the other end thereof is journaled by an arm which is swingable in a fan-shape.

The pair of crank shafts are rotated by a drive unit through gears. The rotation of the crank shafts causes the blade holders of the crank arms engaged therewith to make up/down symmetric motions with respect to the pass line. Then, the blades are opened, closed and opened in the one cycle of the motions to thereby cut a product.

Note that the upper and lower blades employed by the traveling cutting machine 55 are open blades independently mounted on the blade holders of the pair of crank arms and perform traveling and opening/closing motions (rising and falling motions) while the crank shafts rotate once.

FIG. 38 shows an example of the open blades. FIG. 38(a) shows open blades for angle steel, FIG. 38(b) shows open blades for channel steel, and FIG. 38(c) shows open blades for H steel. FIG. 39 is an A—A sectional view of FIG. 38. As can be seen from FIG. 39, the upper and lower blades are independently arranged and independently mounted on a cutting machine (shearing machine) so as to cross each other so that they can be overlapped. Note that the blades open and close (rise and fall) only in a vertical direction when viewed from the cut surface of a product.

FIG. 40 is a view showing another specific example of the inline straightening/traveling cutting system employed by a company B.

The traveling cutting machine 55 employed by the company B is a pendulum type shear.

The pendulum type shear comprises a crank shaft drive unit for opening and closing blades and a drive unit for rotating a crank shaft, which is different from the above crank shaft, for swinging a pendulum forward and backward for traveling cutting.

The blades are accommodated inside the pendulum and composed of independent upper and lower blades. The lower blade is fixed on the bottom base of the pendulum and the upper blade is mounted on a ram coupled with a blade opening/closing crank arm and opens and closes (rises and falls).

Note that the system of the company B does not use a presser roller and a product having comes off a straightening apparatus and to be subjected to "n cut" is transported by a roller (table) including a permanent magnet.

The conventional inline straightening/traveling cutting systems arranged as described above have various problems which will be described below as to classified items.

1. Problem as to the Traveling Cutting Machine
(1) Squareness of Cut Surface

In the conventional crank type shear employed by the company A, cutting is performed while the crank arms make elliptic motions. Whereas, in the pendulum type shear employed by the company B, cutting is performed while the pendulum is swung. Accordingly, in both the shears, a cutting angle is not constant in the lengthwise direction of a product, and cutting begins at "90°−α°" (or "90°+α°") and finishes at 90°. Therefore, the angle of the cut surface of the product cannot be made to 90° geometrically. That is, in the crank type shear employed by the company A, the cut surface is made to a concave/convex shape as shown in FIG. 42, whereas to a convex shape as shown in FIG. 43 in the pendulum type shear employed by the company B.

Such a cut surface is never accepted in the markets of the countries where quality control is severely executed.

(2) Deformation of Cut Surface

Both the crank type shear and the pendulum type shear are an up-and-down-directional guillotine shear using the open blades as shown in FIG. 38, and the blades (upper blade and/or lower blade) move vertically with respect to a product regardless of the shape thereof, when viewed from the traveling direction of the product.

At the time, in the angle steel shown in FIG. 38(a), since the blades has an angle of 45° with respect to a product while they move vertically, the product is cut in a minimum sheet thickness from the start of cutting to the finish thereof. As a result, the cut surface of the angle steel is not deformed and thus the crank type shear and the pendulum type shear are ordinarily used in Japan.

However, in the channel steel, H-steel and the like shown in FIG. 38(b) and FIG. 38(c), and the like, when the blade is moved vertically, a flat web portion is not deformed because it is thin. However, since flange portions, which are formed vertically with respect to the web, are cut in a height direction which is several times as long as the thickness thereof, they are buckled between the point thereof at which cutting is started and the point thereof at which the cutting is finished, whereby character-S deformation is caused thereto by the combination of the concave shape and the concave shape of a cut surface as shown in FIG. 43.

2. Problem Second Aspect to Presser Roller

In the system of pressing section bars against the inter-machine table or the rear surface table by a presser roller employed by a company P or in the system of restricting section bars by a magnet roller employed by a company D, since a plurality of rows of section bars cannot be tightly clamped, there arises a problem that the section bars are unevenly clamped by the dislocation of loosely clamped section bars.

This point will be described in more detail. In the presser roller system, it is arranged as if it was an upper-and-lower-confronting type pinch rollers as shown in FIG. 44. However, since a flat table roller 58a (the roller of the rear surface tilting roller), which transports all the products, also acts as a lower pinch roller, the surface of the table roller 58a is unevenly worn. Further, even if products are clamped, they are in point contact with the table roller 58a as shown by a and b in FIG. 44 due to the simultaneous occurrence of the bad conditions of product shapes and size errors, and intervals shown by c, d and e surrounded by circles in FIG. 44 are generated between the products and the presser roller 57.

Further, in the magnet roller, products are dislocated by the unstable restricting force of a magnet, in addition to the wear of the roller.

A method of shearing a section in a short time by using a fixed blade and a moving blade each provided with a caliber according to the cross-sectional shape of the section and moving the moving blade obliquely downward with respect to the section is disclosed in Japanese Unexamined Patent Publication No. 2-262908, Japanese Patent No. 2616365 and Japanese Unexamined Patent Publication No. 9-136213. In this case, the occurrence of sagging and burring to a cut surface can be prevented and even if they occur, they can be restricted within an allowable range by properly setting a sharing clearance between the fixed blade and the moving blade. However, the clearances between the calibers of the shearing blades and the section (hereinafter, referred to as clearances in the calibers) are, even if they are set to intervals which are contemplated proper, greatly affected by the dimensional tolerance of the section, the curving and bending thereof, the material and wear of the shearing blades, and the like, whereby the shape of the cut surface is often deformed as shown in FIG. 51. FIG. 51 shows modifications of the shape of the cut surface exemplified by channels steels, wherein (a) shows a deformation in which $\theta 1 > 90° > \theta 2$ and $\theta 1$ and $\theta 2$ are not made to right angles, where the angle between one of flange surfaces and a web surface is shown by $\theta 1$ and the angle between the other of the flange surfaces and the web surface is shown by $\theta 2$, whereas (b) shows a case in which the corner portion of a web is sagged and the web is swelled.

These modifications of the cut surface are liable to be particularly caused in a hot-rolled section product in comparison with a cold-rolled section. A reason of it that the sizes and thicknesses of the leading end and the tail end of the hot-rolled section are somewhat increased as compared with those of the intermediate portion thereof. Thus, the size of the caliber must be increased to permit the hot-rolled section to pass therethrough and accordingly the clearance in caliber used in the hot-rolled section is made larger than that used in the cold-rolled section.

Japanese Patent No. 2616365 and Japanese Unexamined Patent Publication No. 9-136213 of the above publications do not take the problem of the clearance in caliber into consideration at all except the Japanese Unexamined Patent Publication No. 2-262908 in which a plurality of divided segment-shaped blades are adjustably disposed in the vicinity of the caliber of a moving blade holder.

However, a cutting method using the divided blades is effective only to a section having an excellent dimensional accuracy over the entire length thereof such as a cold-rolled section and is not applicable to a hot-rolled section because there is a danger of faulty cutting because a large clearance in caliber still exists. Further, the adjustment of the divided blades is time-consuming and troublesome because it is performed on the precondition that the size of a section is measured. Therefore, many problem are caused thereby also in cost. Further, since there are many section bars having a different flange thickness and a different web thickness even if they have the same size, it is actually very difficult and troublesome to set and adjust the clearance in caliber.

Further, the cutting methods disclosed in Japanese Unexamined Patent Publication No. 2-262908, Japanese Patent No. 2616365 and Japanese Unexamined Patent Publication No. 9-136213 relate to the cutting of a single section and do not relate to a multiple section bars cutting method for cutting a plurality of section bars at the same time.

Further, many modern section rolling equipment employ an inline section bar straightening/cutting system. In this case, a plurality of section bars are corrected and cut at the same time and the cut system of the equipment is roughly classified into a stop cutting type and a traveling cutting type. However, any of the types is not an obliquely cutting system for cutting section bars by obliquely moving a moving blade with respect to the section bars and is a vertical cutting system for cutting the section bars by moving the moving blade in a vertical direction. The following cut systems are employed to section bars having at least two surfaces meeting at right angles such as channel steel, H-steel, I-steel, rail and the like.

(1) Stop Cutting System

This is a punching system by means of a cutting machine called a punch cut or a double cut. However, a yield is bad in this system because chips of about 40 mm wide are produced. Further, there is a problem that the quality of a cut surface is not so good.

(2) Traveling Cutting Type

This is a traveling cutting system using a flying shear such as a pendulum shear, a rotary shear and the like. However, since a cutting angle between a blade and a section is not 90° and the cutting angle is dispersed a few degrees in this system, there is a problem that a cut surface cannot be finished at right angles and post processing such as recut and the like must be performed.

It is conceived that an oblique cutting system using a fixed blade and a moving blade each having calibers is superior to the punching system and the cutting system using the flying shear in the quality of cut surface and efficiency. However, when this system is employed to cut multiple section bars, if respective moving blades move in parallel oblique directions as ordinarily conceived, the horizontal component of shear reaction is accumulated. As a result, the quality of a cut surface is deteriorated because backlash is made between shear blades.

DISCLOSURE OF THE INVENTION

An object of the present invention is to obtain a multiple section bars straightening/traveling cutting system in a section bar rolling line by which cut surfaces are not deformed and no dispersion is made in the lengths of finally cut products.

To achieve the above object, first, the present invention provides a multiple section bars straightening/cutting system in a section bar rolling line, which comprises:

a multiple section bars straightening apparatus for straightening the multiple section bars;

an inlet side introduction pinch roller disposed downstream of the multiple section bars straightening apparatus for clamping the section bars corrected by the multiple section bars straightening apparatus and introducing them downstream;

a multiple traveling section bars cutting apparatus disposed downstream of the inlet side introduction pinch roller and having a fixed blade and a moving blade each including a plurality of calipers formed in accordance with the cross-sectional shapes of the section bars for cutting the section bars while they travel by obliquely moving the moving blade with respect to the section bars; and a rear surface tilting table disposed downstream of the multiple traveling section bars cutting apparatus, having an outlet side introduction pinch roller for clamping the section bars, and tilting in the direction in which the blades are moved in synchronism with the movement of the blades.

Second, the present invention provides a section bars cutting method, which comprises the steps of:

(a) preparing a fixed blade and a moving blade each having calipers formed in accordance with the cross-sectional shapes of section bars;

(b) pressing the longitudinal sides of the section bars against the longitudinal sides of the calipers of the fixed blade; and (c) shearing the section bars by moving the moving blade in an oblique direction with respect to the section bars.

Third, the present invention provides a section bars cutting apparatus which comprises:

a fixed blade and a moving blade each having a caliper formed in accordance with the cross-sectional shape of the section and overlapped front and behind.

a press-down means for the moving blade;

a guide means for moving the moving blade in an oblique direction with respect to the section bars and presser means for pressing the longitudinal sides of the section bars against the longitudinal sides of the calipers of the fixed blade before the section bars are cut.

Fourth, the present invention provides a section bars cutting apparatus which comprises:

presser devices disposed near to and in parallel with each other;

a fixed blade device; and a moving blade device, wherein the presser device includes a first knocker slidable in a block in an up and down direction and a slider fitted to the first knocker on a taper surface and slidable in a horizontal direction so as to press the longitudinal sides of the section;

the fixed blade device includes a second knocker slidable in a block in an up and down direction, a lower blade divided into at least two portions along the side of a caliper formed in accordance with the cross-sectional shape of the section and fixed and an upper blade coupled with the second knocker through an elastic member such as a spring or the like;

the moving blade device includes a third knocker slidable in a block in an up and down direction, a moving blade having a caliper formed in accordance with the cross-sectional shape of the section and pressed down by the third knocker and a guide block for guiding the movement of the moving blade in an oblique direction with respect to the section; and the heights of the first to third knockers are lowered in this sequence.

Fifth, the present invention provides a multiple section bars cutting method which comprises the steps of:

using a fixed blade and a plurality of moving blades;

simultaneously shearing a plurality of section bars by moving the plurality of moving blades in oblique directions with respect to the respective section bars; and dividing the moving directions of the plurality of moving blades into left obliquely downward directions and right obliquely downward directions.

Sixth, the present invention provides a multiple section bars cutting apparatus which comprises:

a fixed blade having a plurality of calipers formed in accordance with the cross-sectional shapes of the section bars:

a plurality of moving blades overlapped to the fixed blade; and guide blocks for regulating the moving directions of the plurality of moving blades in left obliquely downward directions and right obliquely downward directions.

Seventh, the present invention provides a multiple section bars cutting method which comprises the steps of:

preparing a fixed blade having a plurality of calipers formed in accordance with the cross-sectional shapes of the section bars and a plurality of moving blades each having similar calipers;

shearing the plurality of section bars substantially at the same time by moving the plurality of moving blades in oblique directions with respect to the respective section bars; and reducing shearing force by obliquely moving the plurality of blades with a time lag.

Eighth, the present invention provides a multiple section bars cutting apparatus which comprises:

a fixed blade having a plurality of calipers formed in accordance with the cross-sectional shapes of the section bars;

a plurality of moving blades overlapped to the fixed blade and each having a caliper similar to the above caliper; and a press-down means disposed to each of the plurality of moving blades, wherein the press-down means has sequentially lowered knocker heights.

BRIEF DESCRIPTION OF THE DRAWINGS

FIG. 51 is a view showing modifications of a cut surface of a section in the second best mode.

BEST MODE OF CARRYING OUT THE INVENTION

First Best Mode

Figure 1:
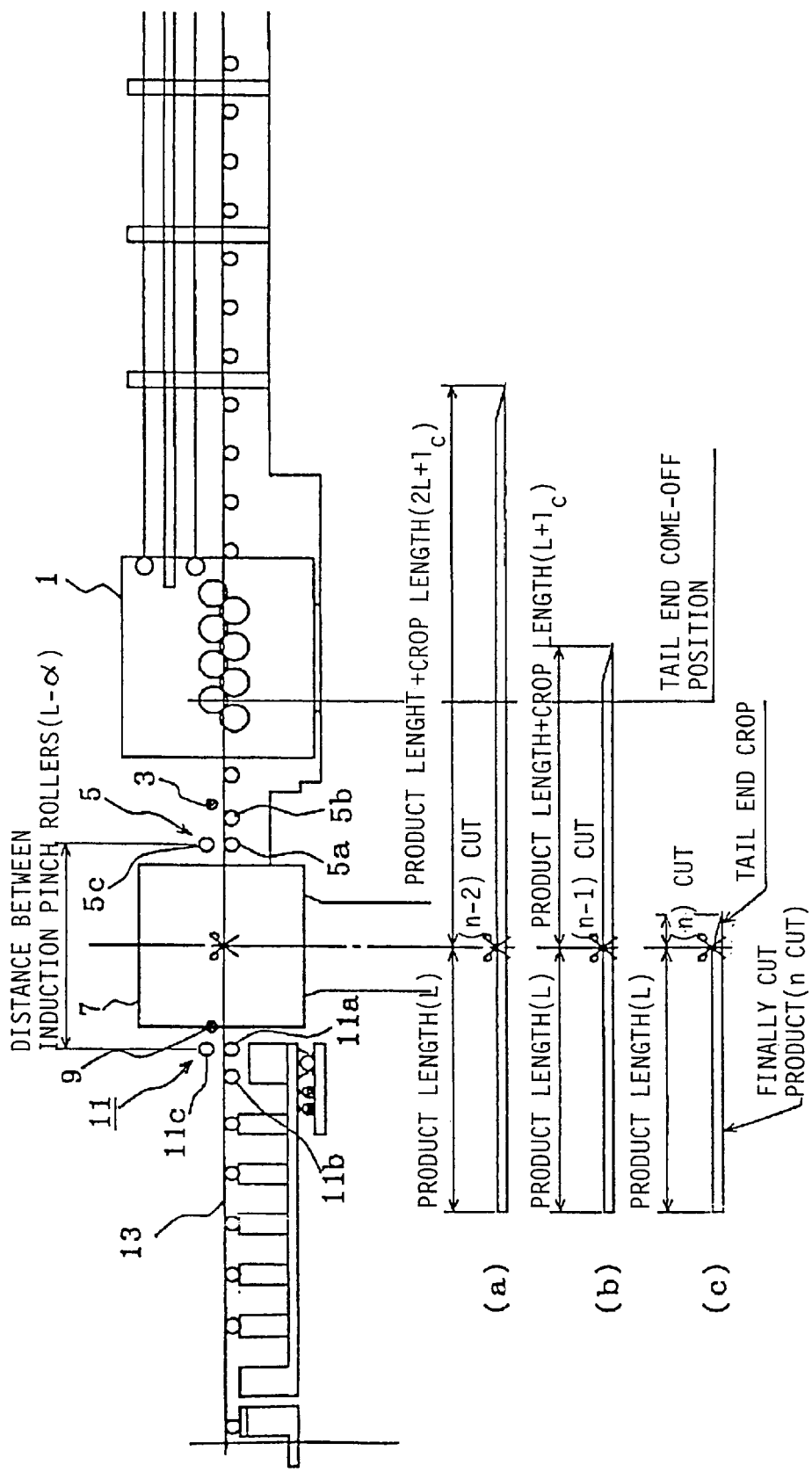
FIG. 1 is a view explaining the first embodiment in the first best mode and is a view showing an inline straightening/cutting system in a hot section bar rolling line.

An multiple section bars straightening/cutting system in an inline section bar rolling line according to the first best mode comprises a multiple section bars straightening apparatus, an inlet side introduction pinch roller, a multiple traveling section bars cutting apparatus and a rear surface tilting table. The multiple section bars straightening apparatus corrects multiple section bars; the inlet side introduction pinch roller is disposed downstream of the multiple section bars straightening apparatus, clamp the section bars corrected by the multiple section bars straightening apparatus and introduce them downstream; the multiple traveling section bars cutting apparatus is disposed downstream of the inlet side introduction pinch roller, includes a fixed blade and a moving blade each having a plurality of calibers formed in accordance with the cross-sectional shapes of the section bars and cuts the section bars while they travel by obliquely moving the moving blade with respect to the section bars; and the rear surface tilting table is disposed downstream of the multiple traveling section bars cutting apparatus, includes an outlet side introduction pinch roller for clamping the section bars and tilts in the moving direction of the blade of the multiple traveling section bars cutting apparatus in synchronism with the movement thereof.

Each of the inlet side introduction pinch roller and the outlet side introduction pinch roller is characterized in that it has two first rollers disposed apart from each other a predetermined distance in the flow direction of the section bars and a second one roller interposed therebetween and that it clamps the section bars between the first rollers and the second roller.

Further, the distance between the two first rollers is adjustable.

The distance between the inlet side introduction pinch roller and the outlet side introduction pinch roller is set shorter than the length obtained by subtracting the distance the section bars travel until leading ends thereof are clamped by the outlet side introduction pinch roller after the leading ends of the section bars reach the position of the outlet side introduction pinch roller from the length of products.

A stopper is provided to regulate the rolling draft of the second roller.

The section bars are clamped by the inlet side introduction pinch roller and transported to the multiple traveling section bars cutting apparatus before they come off the multiple section bars straightening apparatus, the section bars are clamped by the outlet side introduction pinch roller when the leading ends thereof are transported to the position of the outlet side introduction pinch roller, and thereafter the inlet side introduction pinch roller is released.

Further, the rear surface tilting table includes a plurality of tilting direction regulating means capable of regulating a tilting direction in accordance with the moving direction of the blades of the multiple traveling section bars cutting apparatus, and the plurality of tilting direction regulating means can be used by being replaced in accordance with the moving direction of the blades.

The fixed blade is composed of at least two blades constituting calipers and the two blades are arranged so as to be relatively movable so that the section bars are cut by the moving blade after they are clamped by the two blades.

Further, the clearances of the calipers are set such that the cutting of the respective portions of the section bars is finished simultaneously.

First Embodiment

FIG. 1 is view explaining an embodiment of the first best mode and shows an inline straightening/cutting system of a hot section bar rolling line. In the figure, numeral 1 denotes a multiple section bars straightening machine, numeral 3 denotes a first measuring roll disposed downstream of the multiple section bars straightening machine 1, and numeral 5 denotes an inlet side introduction pinch roller 5 disposed downstream of the first measuring roll 3 for clamping the section bars coming off the multiple section bars straightening machine 1. The inlet side introduction pinch roller 5 is composed of three rollers, that is, two lower rollers 5a and 5b and an upper roller 5c disposed above them. Note that the inlet side introduction pinch roller 5 will be described later in detail.

Numeral 7 denotes a multiple traveling section bars cutting machine 7 disposed downstream of the inlet side introduction pinch roller 5 and numeral 9 denotes a second measuring roll disposed downstream of the multiple section bars cutting machine. Numeral 11 denotes an outlet side introduction pinch roller disposed downstream of the second measuring roll 9. The outlet side introduction pinch roller 11 is arranged similarly to the inlet side introduction pinch roller 5 and composed of three rollers, that is, two lower rollers 11a and 11b and an upper roller 11c disposed above them. Numeral 13 denotes a rear surface tilting table disposed downstream of the outlet side introduction pinch roller 11 and refining equipment disposed downstream of the rear surface tilting table 13.

Figure 2:
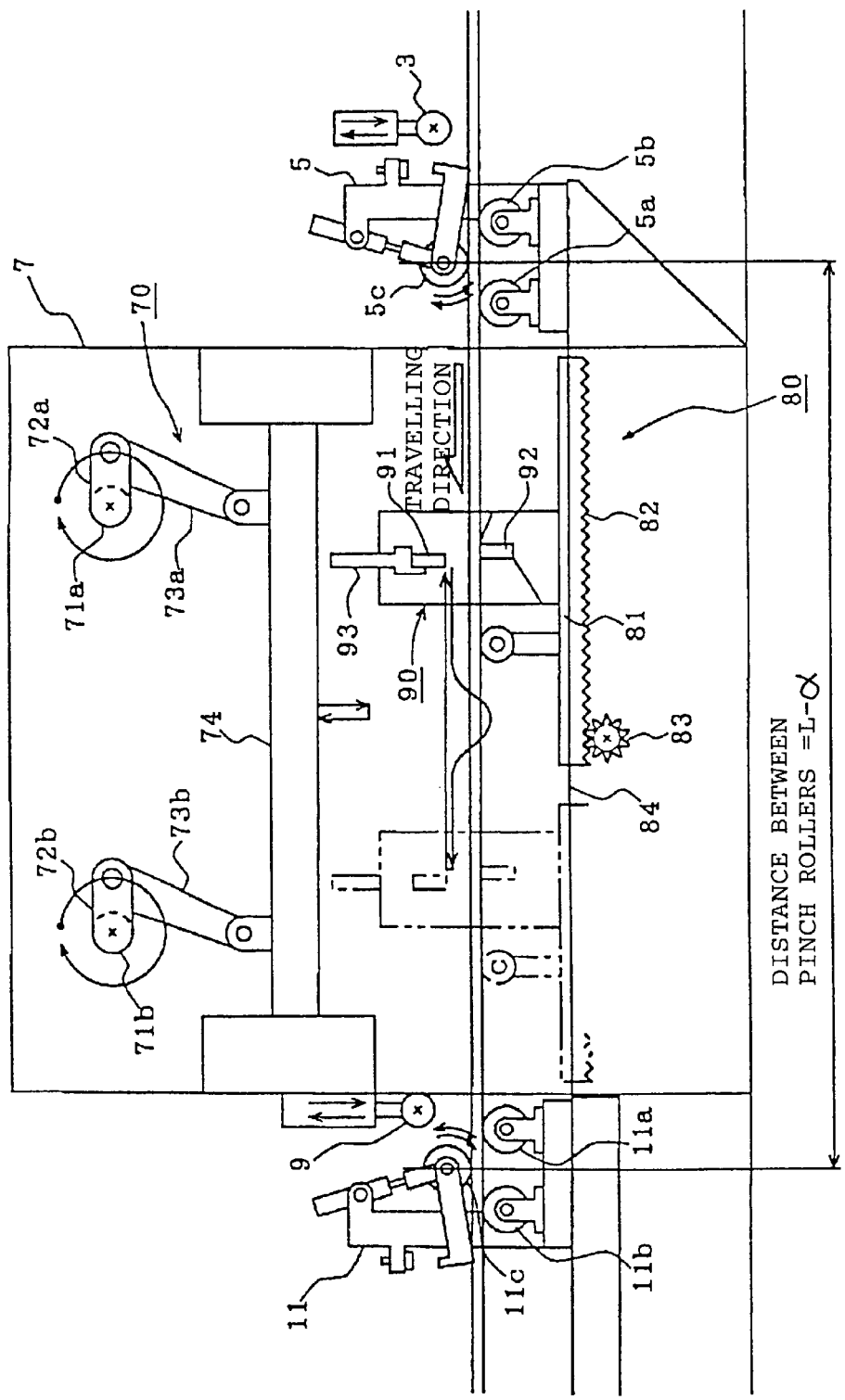
FIG. 2 is a view explaining a traveling cutting apparatus of the first embodiment in the first best mode.

FIG. 2 is an enlarged view showing an example of the multiple traveling section bars cutting machine 7 and the inlet and outlet sides introduction pinch rollers 5 and 11 disposed upstream and downstream thereof. The arrangement of the multiple traveling section bars cutting machine 7 will be described below based on FIG. 2.

The multiple traveling section bars cutting machine 7 comprises a blade set 90 on which a moving blade 91 and a fixed blade 92 are set, a cutting machine drive unit 70 for driving the moving blade 91 on the blade set 90, and a blade set moving unit 80 for moving the blade set 90 in a product moving direction.

The blade set 90 includes the fixed blade 92 disposed therein and the moving blade 91 disposed so as to make shearing operation in contact with the fixed blade 92 together with it, and a knocker 93 is disposed above the moving blade 91.

The cutting machine drive unit 70 comprises a rectangular ram 74 mounted on a casing so as to move upward and downward and connecting rods 73a and b, crank arms 72a and b and crank shafts 71a and b for moving the ram 74 upward and downward.

Further, the blade set moving unit 80 comprises a blade set base 81 on which the blade set 90 is mounted, a rack 82 disposed integrally with the blade set base 81, a pinion 83 meshed with the rack 82 and a blade set base traveling rail 84 on which the blade set base 81 is movably disposed.

Operation of the multiple traveling section bars cutting machine 7 arranged as described above will be described.

The length of a product from a cut point is measured by the measuring roll 9, and the blade set 90 is accelerated by the blade set moving unit 80 and made as fast as the product. When the measured length reaches a preset product length, the cutting machine drive unit 70 is driven and the ram 74 is lowered so as to knock the knocker 93, whereby the product is cut by moving the moving blade 91. After the product is cut, the blade set moving unit 80 is decelerated and stopped so that the blade set 90 is returned to an original start position with one cutting cycle.

According to the multiple traveling section bars cutting machine 7 arranged as described above, since the blades are abutted against the product in an right angle direction at all times, the conventional problem as to the squareness of a cut surface can be solved.

Figure 38:
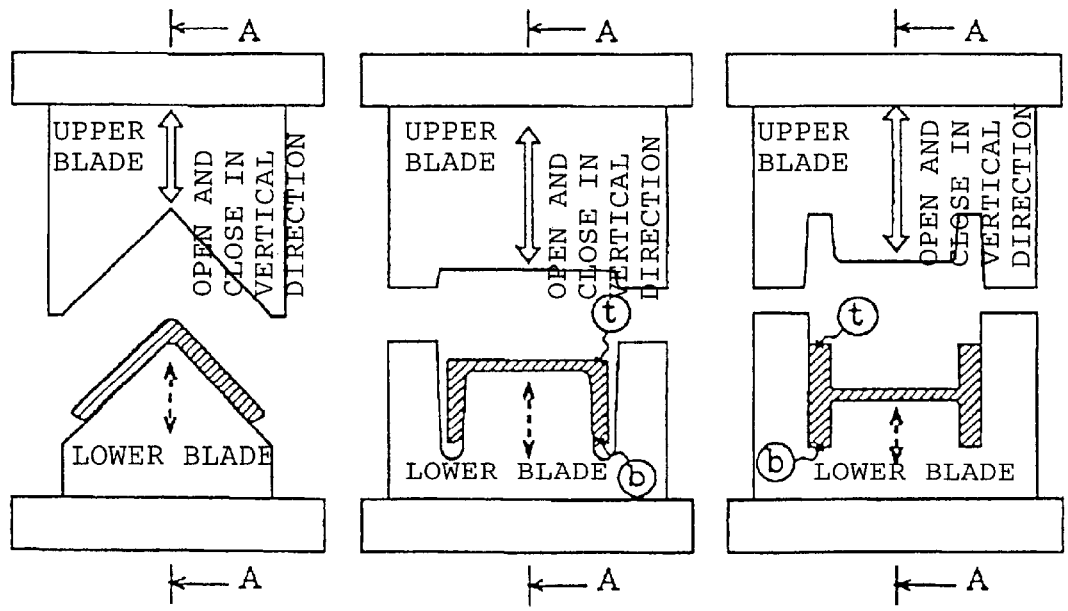
FIG. 38 is a view explaining blades of the conventional apparatus.
Figure 39:
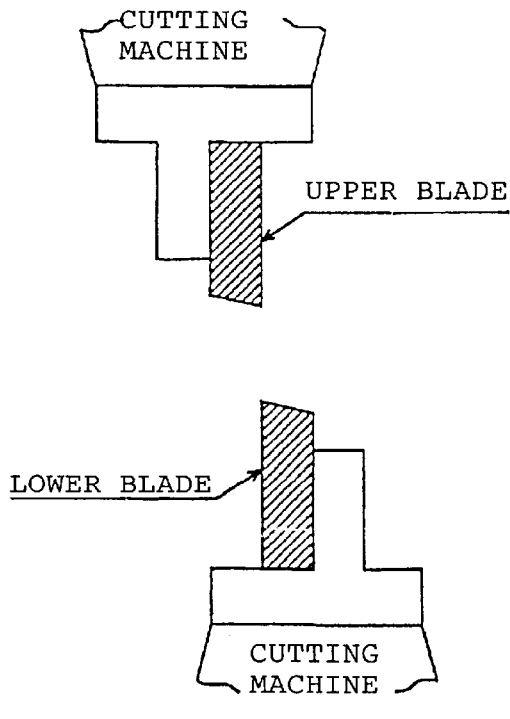
FIG. 39 is a view explaining blades of the conventional apparatus.
Figure 40:
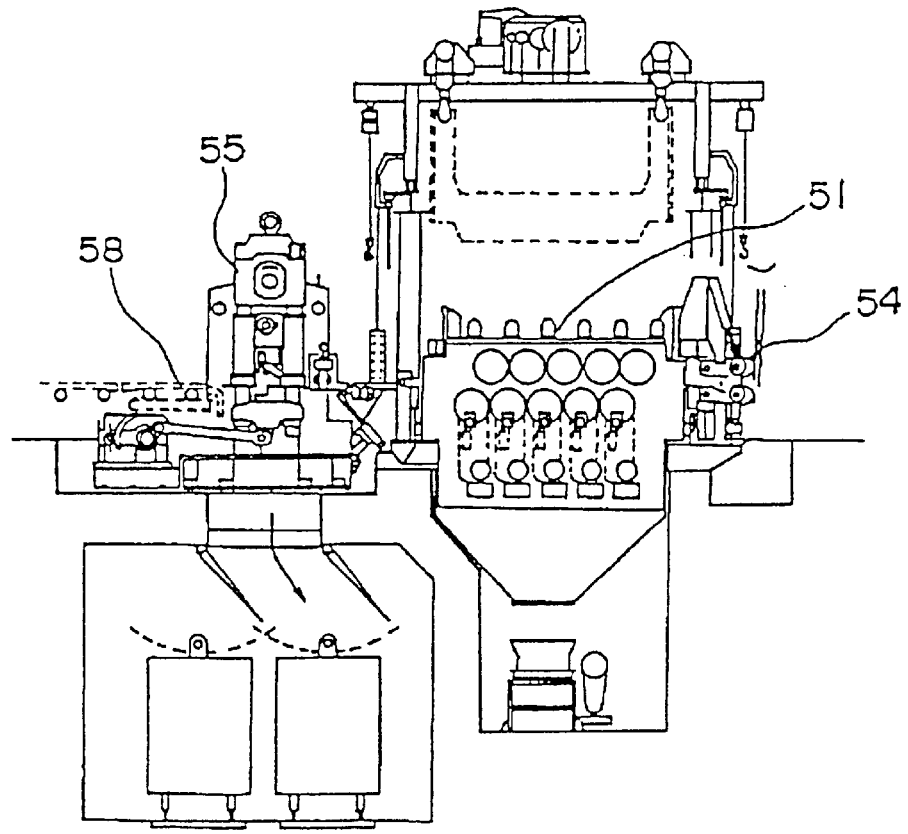
FIG. 40 is a view explaining an apparatus of a conventional inline straightening/traveling cutting system.
Figure 41:
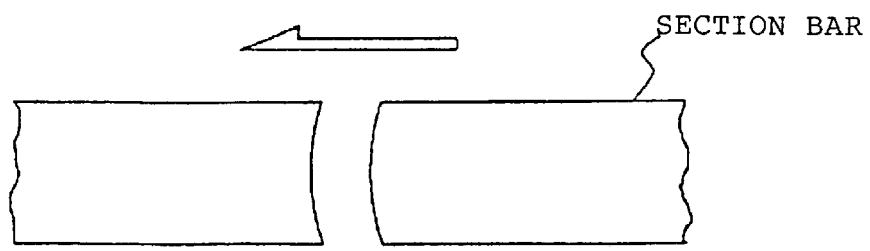
FIG. 41 is a view explaining a conventional subject.
Figure 42:
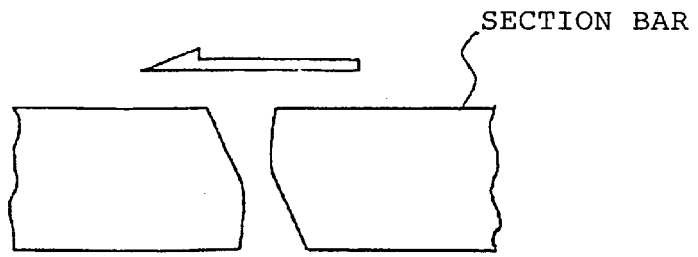
FIG. 42 is a view explaining a conventional subject.

Next, the arrangement of the blade set 90 will be described. Since the blade in the conventional example comprises the open blade as shown in FIG. 38, the blade moves only in a vertical direction with respect to the direction in which a product moves regardless of the shape of the product. As described above, angle steel can be cut in an excellent quality by this blade, but channel steel and H (I) steel other than the angle steel are deformed thereby.

To cope with this problem, the embodiment changes the cutting direction to a rational direction depending upon the angle steel (vertical cutting) and the channel steel and H(I)-steel (oblique cutting) by using 1 a closed blade (caliber blade) so as to make it possible to perform rational cutting reasonably in accordance with the shape of each product. The rational direction means here a direction in which an average plate thickness (cutting distance) is minimized.

Figure 4:
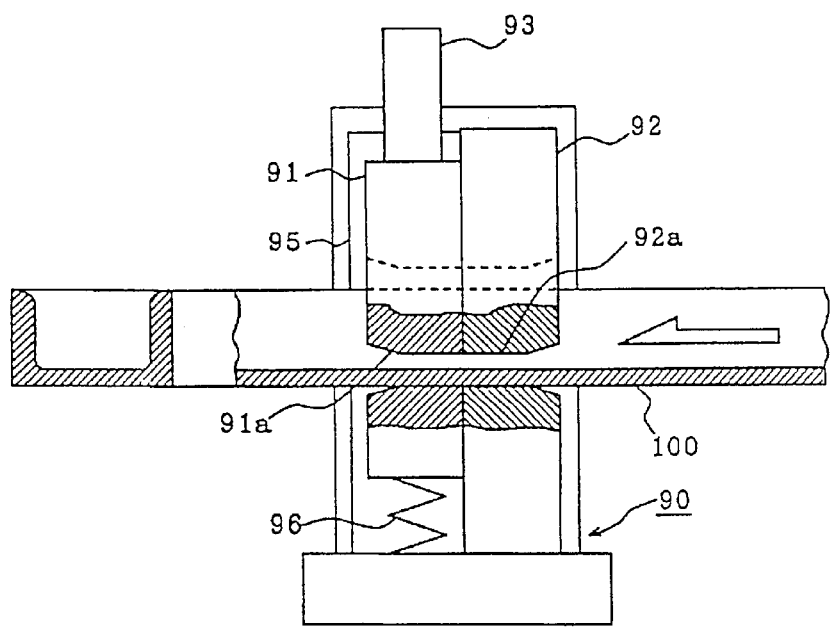
FIG. 4 is a view explaining a blade set of the first embodiment in the first best mode.
Figure 5:
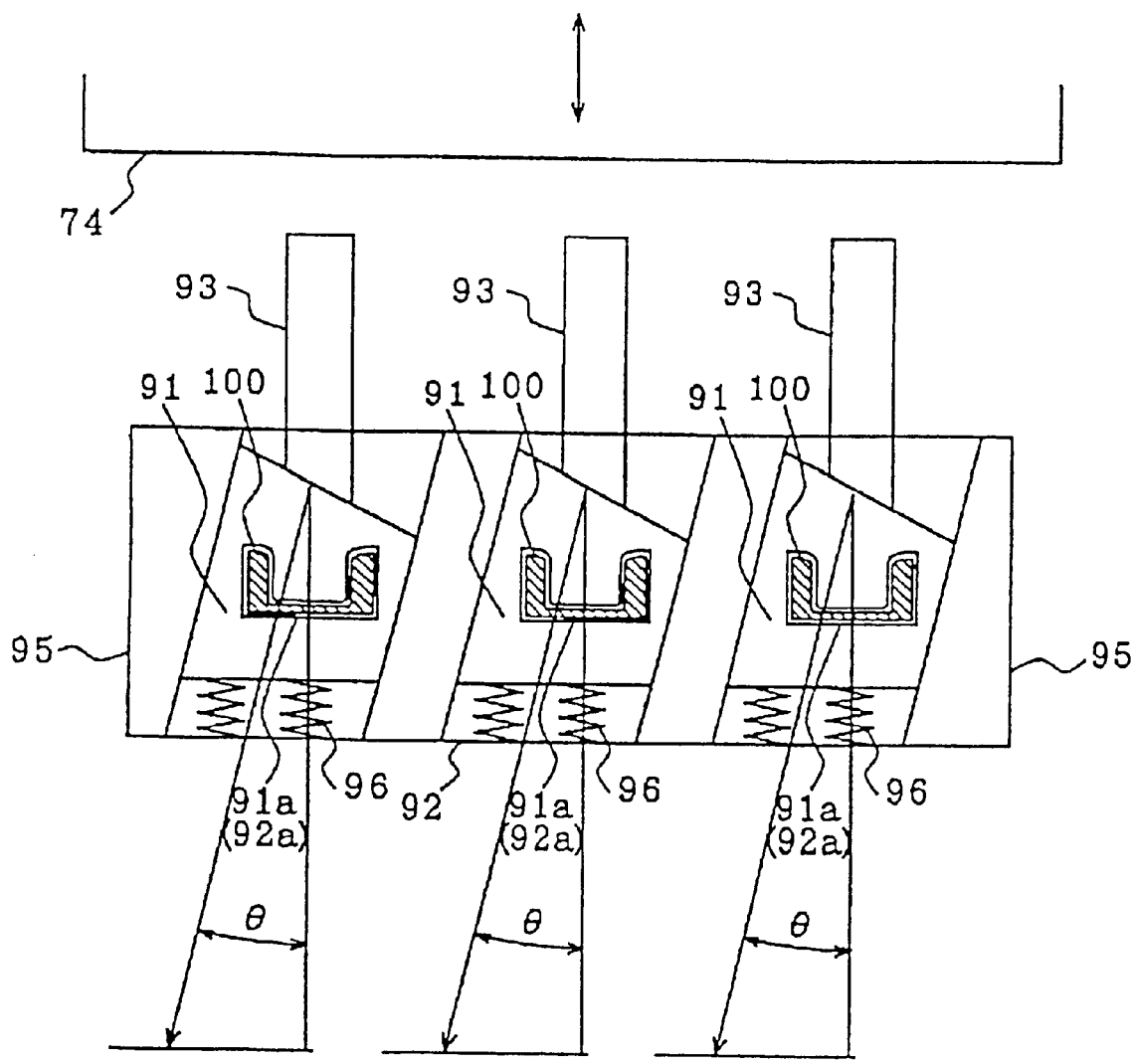
FIG. 5 is a view explaining the blade set of the first embodiment in the first best mode.

FIG. 4 is a side elevational view, partly in cross section, of the blade set 90 and FIG. 5 is a front elevational view. The blade set 90 exemplified here is arranged to handle three channel steels.

In FIG. 4 and FIG. 5, numeral 100 denotes a channel steel as a member to be cut and respective channel steels are inserted into the blade set 90 in an ordinary attitude in parallel with each other. A caliper 92a is formed at each of the fixed blades 92 in accordance with the cross-sectional shape of each channel steel 100. Each of the moving blades 91 includes a caliper 91a having the same shape and size as those of the fixed blade 92, and each moving blade 91 can be moved in a left oblique downward direction. Numeral 95 denotes guide blocks for regulating the moving directions of the moving blades 91. Numeral 96 denotes return springs 96 disposed below the moving blades 91 for returning the respective moving blades 91.

The fixed blade 92 is fixed to the blade set 90 and the respective moving blades 91 move in predetermined directions on the front surface of the fixed blade 92 between the plurality of guide blocks 95 fixed thereto, respectively. The movement is performed by the knocker 93 pressed downward by the ram 74. As a result, the three channel steels 100 can be obliquely cut simultaneously.

Figure 43:
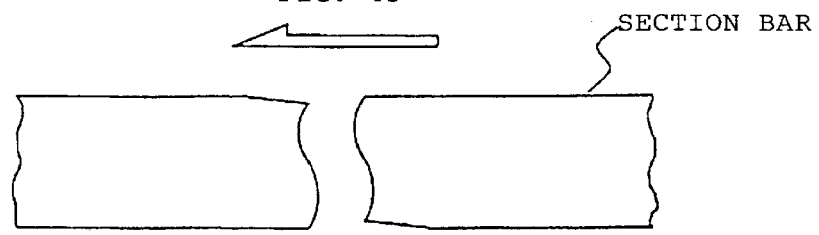
FIG. 43 is a view explaining a conventional subject.
Figure 44:
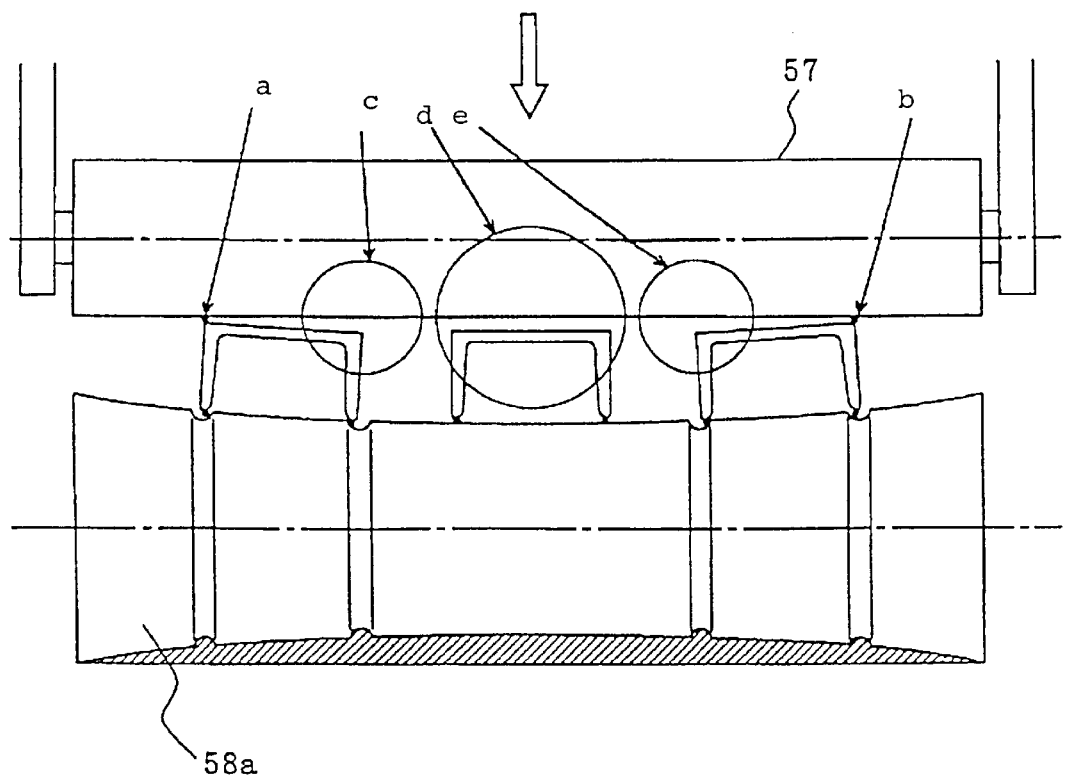
FIG. 44 is a view explaining a conventional subject.

According to the blade set 90 of the first embodiment, the products can be instantly cut while they are held in the ordinary attitude in such a manner that the average plate thicknesses of the respective surfaces thereof are minimized. Therefore, no S-character deformation as in the conventional example shown in FIG. 43 does not arise.

Next, the inlet and outlet side introduction pinch rollers 5 and 11 will be described which is employed to solve the problem of dispersion of the lengths of the products which occurs in the final n cut.

First, the disposition of the inlet side introduction pinch roller 5 and the outlet side introduction pinch roller 11 will be described based on FIG. 1. Since the outlet side introduction pinch roller 11 pinches a section bar having passed through the inlet side introduction pinch roller 5, it is preferable that the intervals therebetween are as short as possible. However, the intervals are restricted by themselves because the multiple traveling section bars cutting machine 7 is installed therebetween.

However, the maximum distance therebetween is determined by a minimum length of product to be cut to satisfy the condition that a section bar is always pinched, and it is an absolute condition to set the distance shorter than the minimum length.

That is, when the product length is represented by L, the distance therebetween is represented by L-α, where a is defined by the length a product which travels until the section bar is clamped by the lowered upper roller 11c of the outlet side introduction pinch roller 11 after the leading end of the section bar reaches the position of outlet side introduction pinch roller 11. In general, when the minimum product length is represented by L MIN, the distance between the inlet and outlet side introduction pinch rollers 5 and 11 is within L MIN—(1.0 m to 1.4 m).

Figure 6:
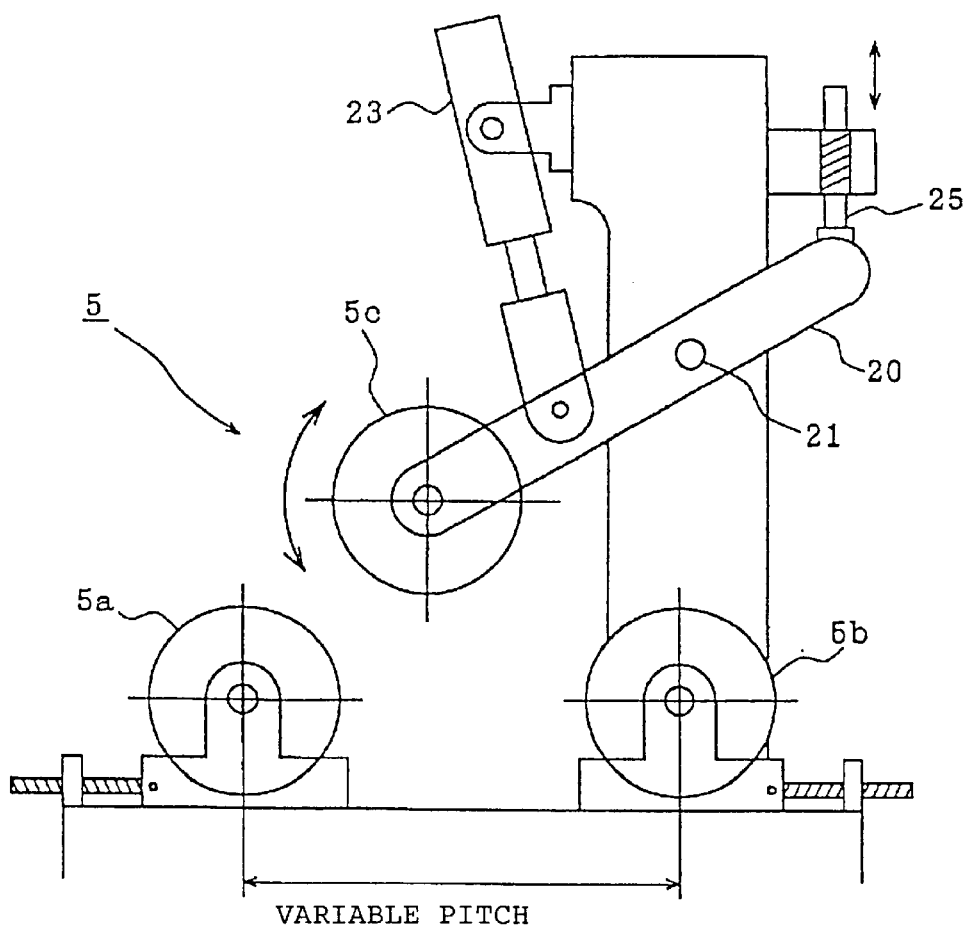
FIG. 6 is a view explaining a pinch roller of the first embodiment in the first best mode.

Next, the arrangement of the inlet and outlet side introduction pinch rollers 5 and 11 will be described. FIG. 6 is a view explaining the inlet side introduction pinch roller 5. Note that the outlet side introduction pinch roller 11 is arranged similarly to the inlet side introduction pinch roller 5 except that the right and left sides thereof is arranged reversely to those of the inlet side introduction pinch roller 5.

As described above, the inlet side introduction pinch roller 5 is composed of the three rollers, that is, the two lower rollers 5a and 5b and the one upper roller 5c. The upper roller 5c is lowered only when it is used so that a section bar is clamped between the upper roller 5c and the lower rollers 5a and 5b.

The lower rollers 5a and 5b are disposed on such a level that section bars horizontally travel between the upstream multiple section bars straightening machine 1, the downstream multiple traveling section bars cutting machine 7 and the rear surface tilting table 13. Further, the two lower rollers 5a and 5b are arranged such that the intervals therebetween can be adjusted. The upper roller 5c is mounted to the extreme end of an arm 20, and the arm 20 is rotatably fixed to a fixing side at the intermediate portion 21 thereof. Numeral 23 denotes an expandable hydraulic actuator which is installed to the fixing side as well as the extreme end of which is connected to the arm 20. The drive of the hydraulic actuator 23 permits the arm 20 to be rotated about the intermediate portion 21 to thereby move the upper roller 5c upward and downward. In addition, the reducing force of the upper roller 5c can be adjusted by adjusting the hydraulic pressure of hydraulic actuator 23 so that the pinch force thereof can be adjusted in accordance with the size of a product.

Numeral 25 denotes a draft adjusting stopper 25 for adjusting the lowering limit position of the upper roller 5c by regulating the rotation of the arm 20 on the base end side thereof so that it can optionally determine a rolling draft $\Delta H$. The rolling draft $\Delta H$ is a value determined depending upon the type of each product and must be at least larger than the following value so that all the multiple section bars can be tightly clamped.

That is, when a target product thickness is represented by t mm, the thickness of a product which is rolled in a maximum permissible roll gap is represented by t max mm, the rolling draft $\Delta H$ must be larger than the difference $\Delta t$ (t max−t) between the product thickness t mm and t max mm.

However, when a stress caused to a product exceeds a yield point at the time the product is clamped in the rolling draft $\Delta H$, plastic distortion is caused to the product and thus the product lacks appropriateness. Therefore, it is necessary to prevent the stress caused to the product from exceeding the yield point while securing the rolling draft $\Delta H$. In this respect, according to the embodiment, the stress caused to product can be easily adjusted so as not to exceed the yield point by adjusting the distance between the lower rollers 5a and 5b.

In short, when the rolling draft $\Delta H$ is set by the stopper 25 for the type of each product as well as the distance between the lower rollers 5a and 5b is set to a predetermined length, the press force of the upper roller 5c need not be finely adjusted so long as it is larger than a value by which the rolling draft $\Delta H$ can be secured.

Incidentally, the following method may be employed as a method of preventing the stress caused to the product from exceeding the yield point while securing the rolling draft $\Delta H$. That is, the method is executed by fixing the distance between the lower rollers 5a and 5b, measuring a press force by which the rolling draft $\Delta H$ can be secured in the distance as well as which does not exceed the yield point, and adjusting the press force of the upper roller 5c so as not to exceed the measured value.

The use of the inlet side introduction pinch roller 5 arranged as described above permits many section bars having a different thickness to be simultaneously clamped, and the section bars can be transported at an approximately constant velocity. At the time, the error of traveling distance of the section bars is within 1 mm per one meter of travel.

That is, since the section bars, which are disposed over the two lower rollers 5a and 5b, are somewhat flexed by being reduced in thickness by the upper roller 5c, all of the section bars can be securely clamped even if the thicknesses thereof are different.

Figure 7:
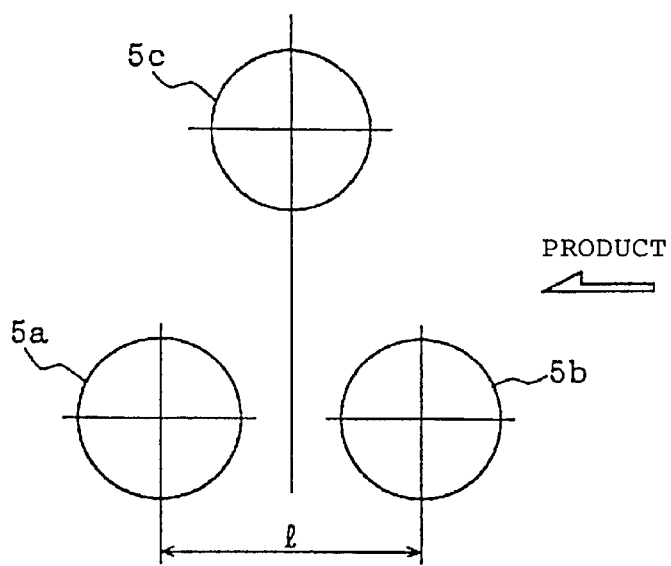
FIG. 7 is a view explaining a waiting state of the pinch roller of the first embodiment in the first best mode.
Figure 8:
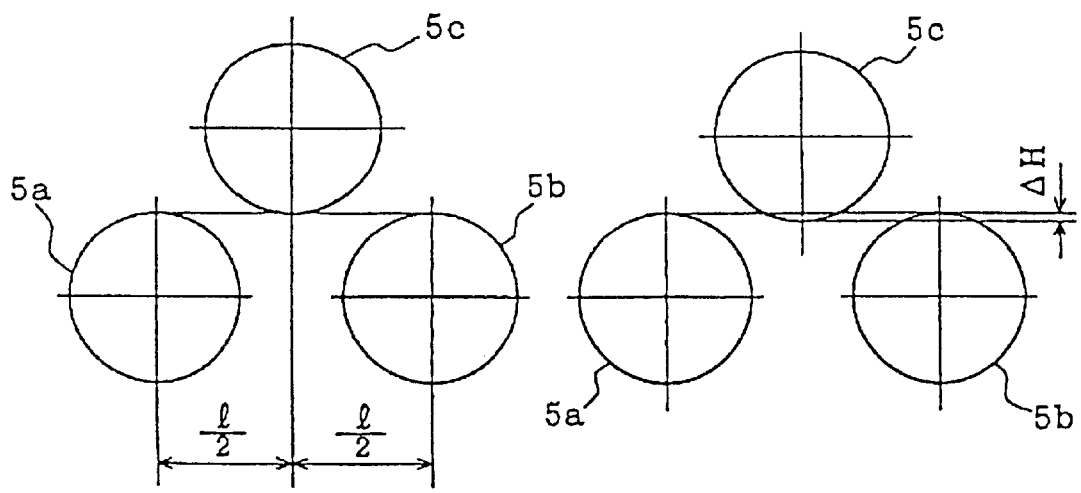
FIG. 8 is a view explaining a state in use of the pinch roller of the first embodiment in the first best mode.
Figure 9:
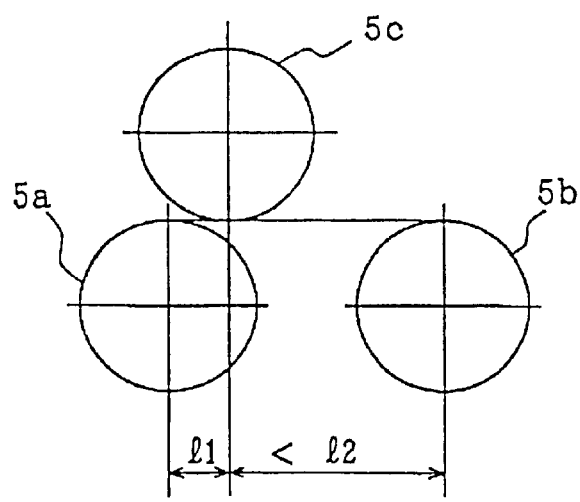
FIG. 9 is a view explaining the state in use of the pinch roller of the first embodiment in the first best mode.

FIG. 7 to FIG. 9 are views explaining how the lower rollers 5a and 5b and the upper roller 5c are disposed. FIG. 7 shows a waiting state in which the upper roller 5c is disposed above the lower rollers 5a and 5b. FIG. 8 shows a state in use in which the upper roller 5c is interposed between the lower rollers 5a and 5b. Further, FIG. 9 shows a state in use in which the upper roller 5c is disposed near to the lower roller 5a by moving the lower rollers 5a and 5b from the state shown in FIG. 8.

As described above, the relative positions of the upper roller 5c and the lower rollers 5a and 5b can be optionally changed so as to clamp section bars in accordance with the type thereof.

Next, a process for cutting section bars using the inlet and outlet side introduction pinch rollers 5 and 11 arranged as described above will be specifically described with reference to FIG. 1 again. When it is supposed that each of section bars on the cooling bed is cut to n pieces of products each having a product length L, (a) shows the (n−2) cut, (b) shows the (n−1) cut and (c) shows the n cut, respectively. Further, the product length is L and the crop length of a tail end is lc.

In the state of (n−2) cut shown in (a), the section bars are restricted and fed downstream by the multiple section bars straightening machine 1 and cut by the multiple traveling section bars cutting machine 7 to the product length L. Thus, the length of a remaining portion is 2L+lc.

In the state of (n−1) cut shown in (b), the section bars are still restricted by the multiple section bars straightening machine 1 and the length of the remaining portion is made to L+lc after they are cut by the multiple traveling section bars cutting machine 7. Thereafter, the tail ends of the section bars come off the multiple section bars straightening machine before they are subjected to the n cut. To cope with this problem, the section bars are clamped by the inlet side introduction pinch roller 5 first before they come off the multiple section bars straightening machine 1, fed downstream while being synchronized with the multiple section bars straightening machine 1 at first. After the section bars come off the multiple section bars straightening machine 1, they are fed downstream only by the restricting force of the inlet side introduction pinch roller 5. At the time, since the inlet side introduction pinch roller 5 is arranged as shown in FIG. 6 and clamps the section bars in the state shown in FIG. 8 or FIG. 9, even if the multiple section bars have a different thickness, all the section bars are securely clamped and no difference is caused to the traveling velocities of the respective section bar.

As soon as the leading ends of finally cut products (length: L+lc) pass through the outlet side introduction pinch roller 11, they are clamped by the outlet side introduction pinch roller 11. At the time, since the distance between the inlet and outlet side introduction pinch rollers 5 and 11 is set within L−α as described above, when the inlet side introduction pinch roller 5 is released after the outlet side introduction pinch roller 11 clamps the leading ends of the finally cut products, the deformed tail ends thereof do not yet reach the position of the inlet side introduction pinch roller 5 and are not clamped thereby. Accordingly, the adverse affect caused by clamping deformed section bars can be avoided.

As described above, the dispersion of finally cut (n cuts) product, which is a critical defect of the conventional traveling cutting system, can be suppressed and the accuracy of the length of the final cut product can be increased to a level similar to the accuracy level of the 1 cut to n−1 cut products by the use of the inlet and outlet side introduction pinch rollers 5 and 11 of the embodiment.

Next, the arrangement of the rear surface tilting table 13 will be described. First, a reason why the rear surface tilting table 13 is employed will be described.

Since a section bar is cut in a state that it is pinched by the outlet side introduction pinch roller 11, the section bar must be moved, when it is cut, in the same direction as a cutting direction (direction in which the moving blade moves) by the same amount as the moving amount of a cut portion. To make this possible, the outlet side introduction pinch roller 11 must be tilted in synchronism with the cutting. Since an angle steel is cut in a vertical direction and a channel steel and H(I)-steel are cut in an oblique direction, a tilting direction must be changed to the vertical direction and the oblique direction in accordance with the cutting direction.

To satisfy the above requirement, the rear surface tilting table 13 having the above function is developed so that the occurrence of bending in cutting is prevented by mounting the outlet side introduction pinch roller 11 on the rear surface tilting table 13.

Figure 10:
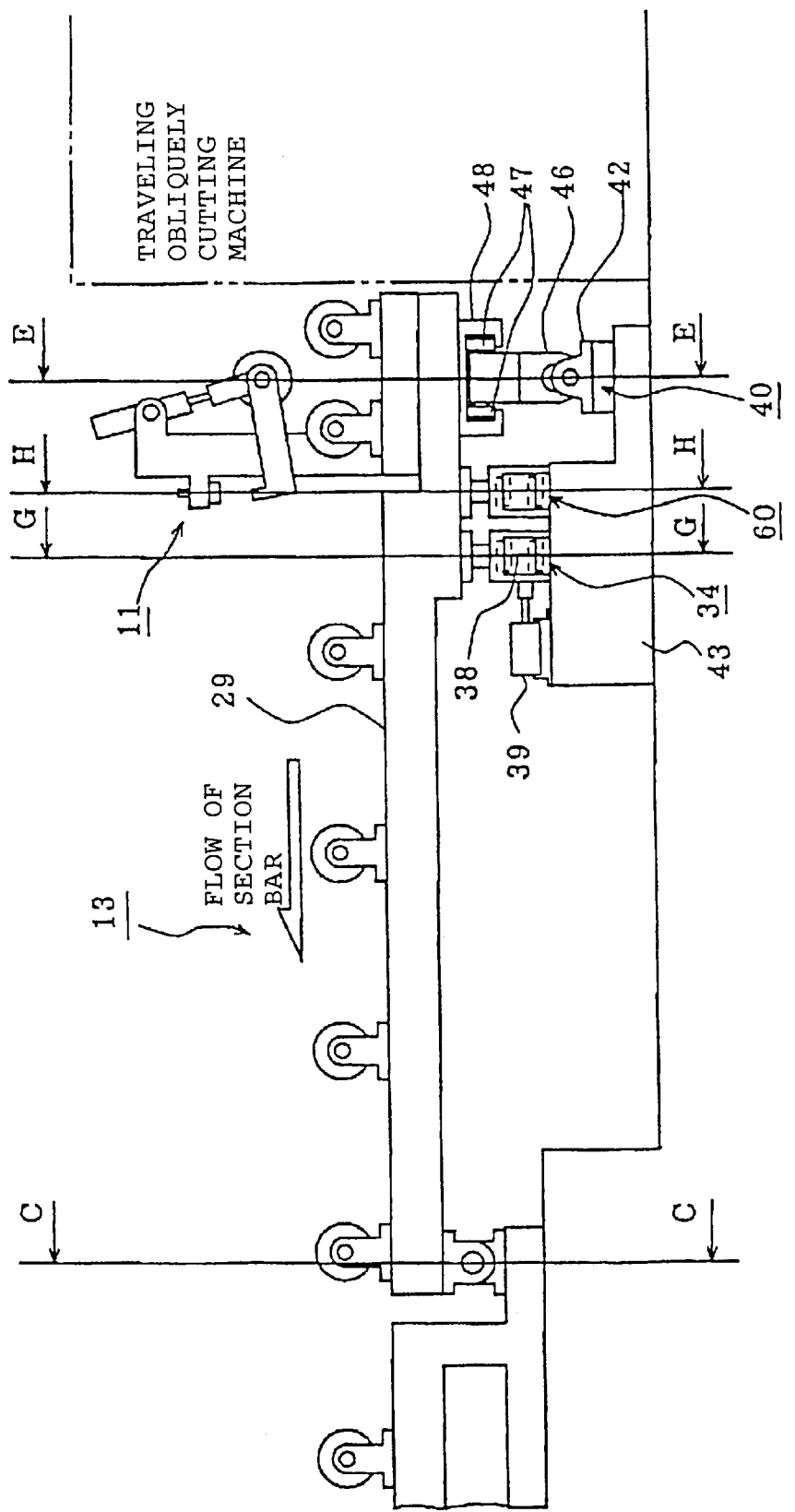
FIG. 10 is a side elevational view of a rear surface tilting table of the first embodiment in the first best mode.

FIG. 10 is a side elevational view of the rear surface tilting table applied to the embodiment. The rear surface tilting table 13 mainly comprises a table 29, a tracing unit 34, a tracing unit 60, the outlet side introduction pinch roller 11 and a tilting drive unit 40. The tracing unit 34 is disposed under the table 29 on the base end side (upstream side) thereof for guiding a tilting direction in a constant tilting direction; the tracing unit 60 guides the tilting direction in a vertical direction similarly; the outlet side introduction pinch roller 11 is disposed on the base end side of the table 29 integrally therewith; and the tilting drive unit 40 is disposed below the outlet side introduction pinch roller 11. The respective components will be described below in detail.

Figure 11:
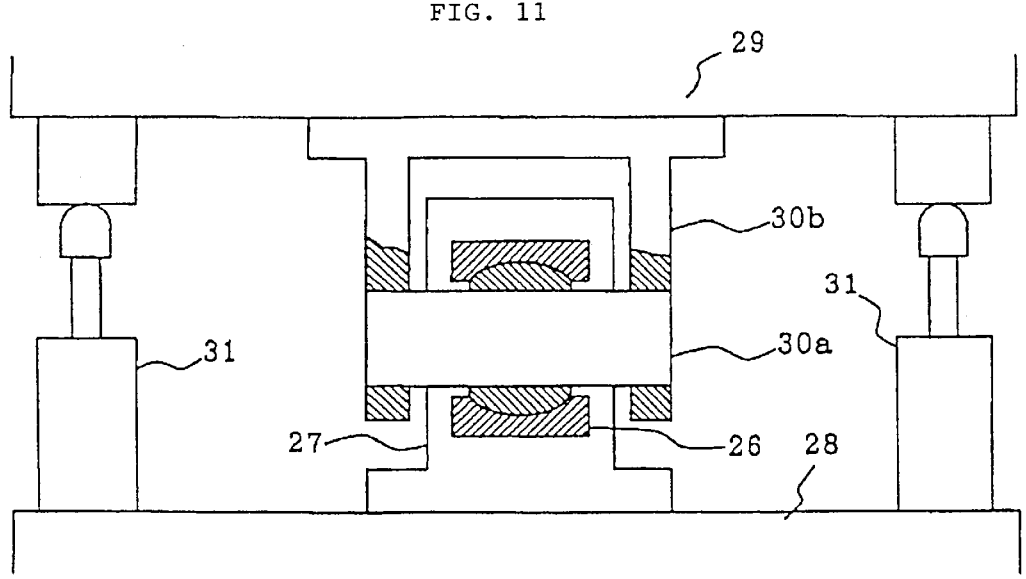
FIG. 11 is a C—C sectional view of FIG. 10.

FIG. 11 is a C—C section in FIG. 10 and shows a tilting pivot section. The tilting pivot section will be described based on FIG. 10 and FIG. 11. In the figures, numeral 28 denotes a lower base, numeral 27 denotes a bearing box fixed to the lower base 28, and numeral 26 denotes a three-dimensionally rotatable self-centering bearing 26. The self-centering bearing 26 rotatably supports the table 29 through a shaft 30a and a bearing 30b.

Numeral 31 denotes balance cushions disposed on both the sides of the table 29 in the width direction thereof on the same cross section as that of the self-centering bearing 26 for stabilizing the table 29 against pitching.

Figure 12:
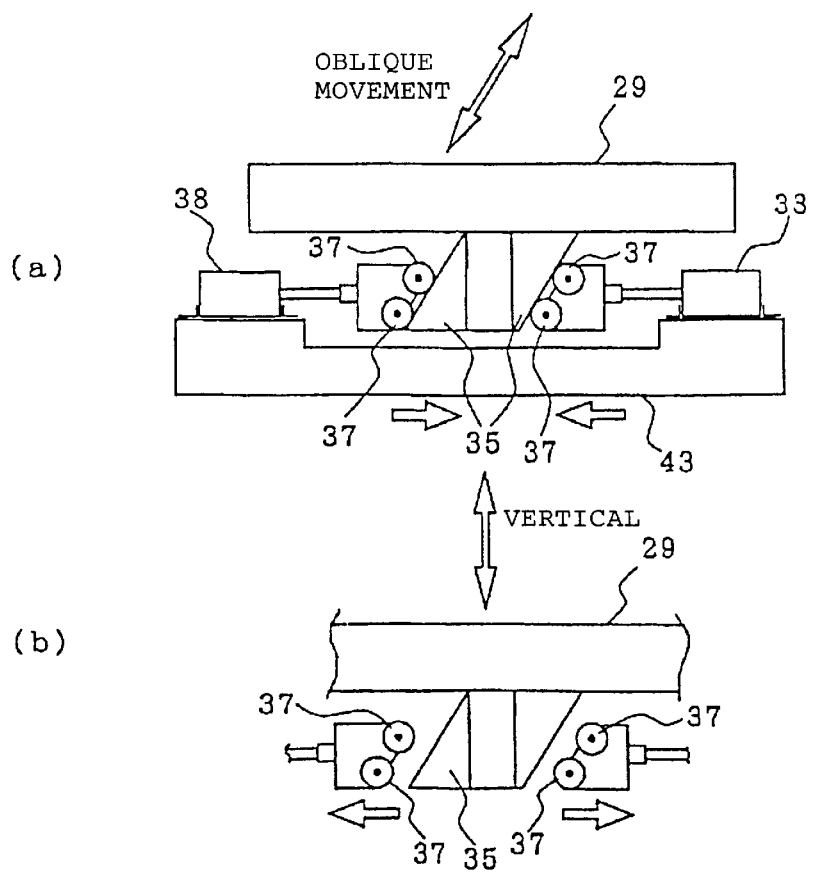
FIG. 12 is a G—G sectional view of FIG. 10.
Figure 13:
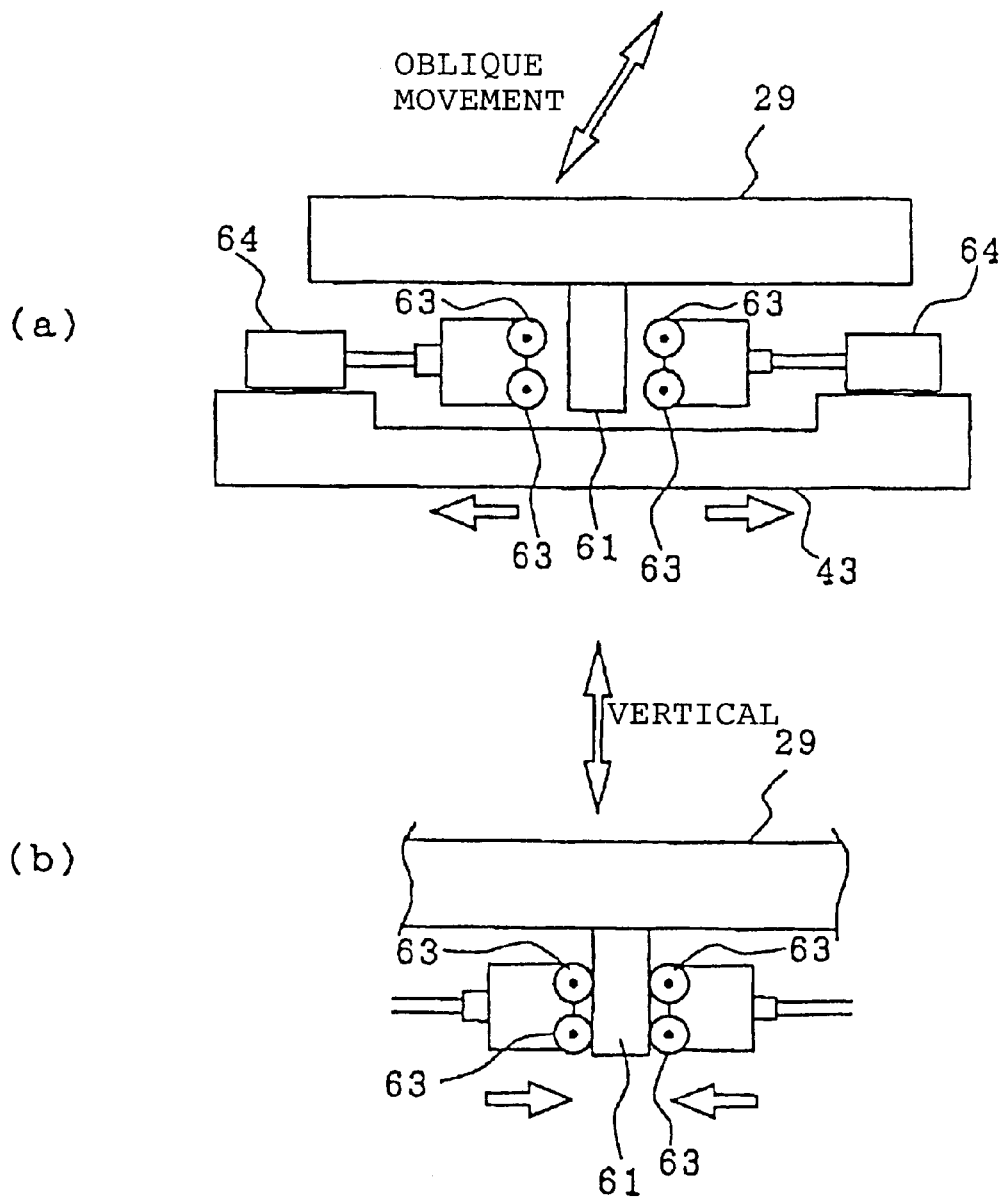
FIG. 13 is an H—H sectional view of FIG. 10.

FIG. 12 is a sectional view in the directions of the arrows G—G in FIG. 10, and FIG. 13 is a sectional view in the directions of the arrows H—H in FIG. 10.

First, the arrangement of the tracing unit 34 will be described based on FIG. 10 and FIG. 12. As shown in FIG. 12(a), the tracing unit 34 includes tilting rails 35 fixed under the table 29 by being tilted a predetermined angle and four guide rollers 37 disposed on the right and left sides of the tilting rail 35 so as to movably guide the tilting rails 35. The guide rollers 37 can be moved by an actuator 38 so that it is in contact with and separated from the tilting rails 35. Further, there is provided with a tapered-wedge type actuator 39 to fix the positions of the guide rollers 37 in the state that they are abutted against the tilting rails 35.

In the tracing unit 34 arranged as described above, the table 29 can be guided in the tilting direction of the tilting rails 35 by causing the guide rollers 37 to be abutted against the tilting rails 35, whereas the regulation performed by the tilting rails 35 can be released by separating the guide rollers 37 from the tilting rails 35 as shown in FIG. 12(b).

Next, the arrangement of the tracing unit 60 will be described based on FIG. 10 and FIG. 13. As shown in FIG. 13(a), the tracing unit 60 includes a vertical rail 61 fixed under the table 29 and four guide rollers 63 disposed on the right and left sides of the vertical rail 61 for movably guiding the vertical rail 61. The guide rollers 63 can be moved by actuators 64 so as to come into contact with and separated from the vertical rail 61.

In the tracing unit 60 arranged as described above, the table 29 can be guided in a vertical direction along the vertical rail 61 by causing the guide rollers 63 to be abutted against the vertical rail 61 as shown in FIG. 13(b), whereas the regulation performed by the vertical rail 61 can be released by separating the guide rollers 63 from the vertical rail 61 as shown in FIG. 13(a).

Figure 14:
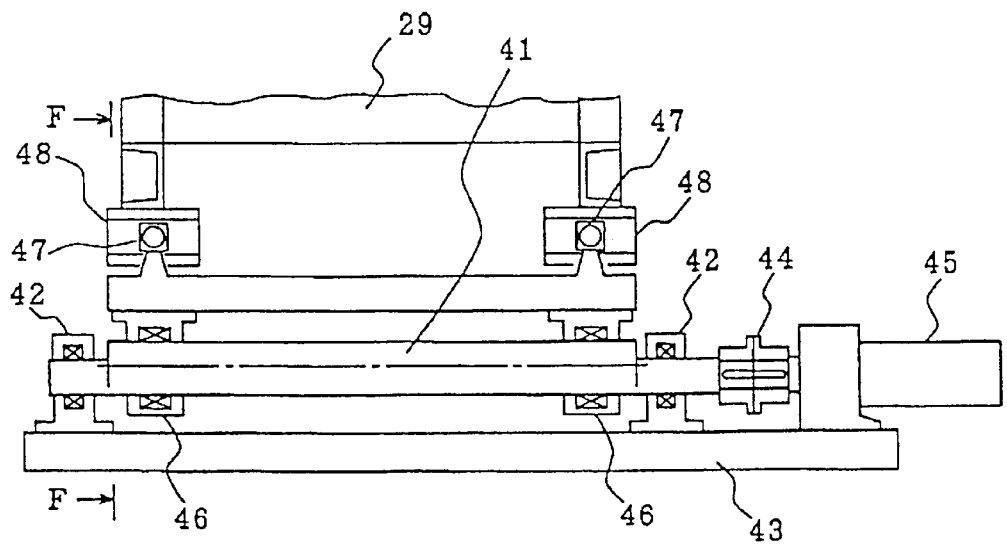
FIG. 14 is an E—E sectional view of FIG. 10.
Figure 15:
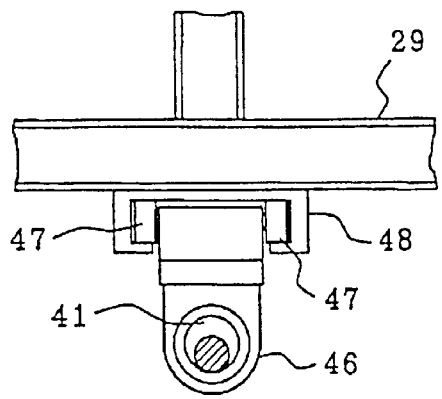
FIG. 15 is an F—F sectional view of FIG. 14.

FIG. 14 illustrating an E—E section in FIG. 10 shows the main portion of the tilting drive unit 40. FIG. 15 is a sectional view in the directions of the arrows F—F in FIG. 14. The arrangement of the tilting drive unit 40 will be described below based on FIG. 10, FIG. 14 and FIG. 15. In the figure, numeral 41 denotes an eccentric shaft 41, and the table 29 can be moved upward and downward by rotating it. The eccentric amount of the eccentric shaft 41 is set such that the lowering amount of the table 29 lowered by the one revolution of the eccentric shaft 41 is made equal to the lowering amount of a section in cutting. The completely round portions of the eccentric shaft 41 at both the ends thereof are fixed to a base frame 43 through two bearings 42.

Bearings 46 are assembled to both the sides of the eccentric portion of the eccentric shaft 41 and sliders 47 are disposed on the bearings 46. The sliders 47 are accommodated in rails 48 formed integrally with the tilting table to thereby regulate the movement thereof in an up and down direction. That is, the table 29 is supported by the bearings 46 through the sliders 47 in the state that the movement thereof in the up and down direction is regulated as well as it is free to move in the width direction thereof (direction perpendicular to a lengthwise direction).

The eccentric shaft 41 is connected to a drive motor 45 through a coupling 44. Then, the drive motor 45 is driven in synchronism with the cutting cycle of the obliquely cutting machine and rotates once in each cycle. With this arrangement, the table 29 falls by the same amount as the falling amount of the blades of the traveling obliquely cutting machine, which will be described later, at the same timing as that of the blades.

Operation for cutting a section bar while it travels using the rear surface tilting table 13 arranged as described above will be described based on FIG. 10 to FIG. 15. Note that since the tracing unit 34 is operated in oblique cutting, the guide rollers 37 are abutted against the tilting rails 35 by the actuator 38 as shown in FIG. 12(a) as well as the guide rollers 63 are separated from the vertical rail 61 by the actuators 64 as shown in FIG. 13(a).

Conversely, when the tracing unit 60 is operated in vertical cutting, the guide rollers 63 are abutted against the vertical rail 61 by the actuators 64 as shown in FIG. 13(b) as well as the guide rollers 37 are separated from the tilting rails 35 by the actuator 38 as shown in FIG. 12(b).

The basic operation of the traveling cutting is similar to that described in the paragraph of the aforesaid inlet and outlet side introduction pinch rollers 5 and 11. That is, first, section bars are pinched by the inlet side introduction pinch roller 5 before they come off the multiple section bars straightening apparatus 51, and the section bars are fed downstream in the pinched state in synchronism with the multiple section bars straightening apparatus 51. After the section bars come off the multiple section bars straightening apparatus 51, they are fed downstream by the restricting force of only the inlet side introduction pinch roller 5. Then, as soon as the leading ends of finally cut products (length: L+lc) are fed up to the position of the outlet side introduction pinch roller 11, they are pinched thereby.

As soon as the section bars are cut by moving the moving blade 91 of the multiple traveling section bars cutting machine 7, the tilting drive unit 40 is driven so as to tilt the table 29 by the same amount as the moving amount of the moving blade 91 in synchronism with the movement thereof. With this operation, the plurality of section bars can be cut without being bent and without being dislocated therebetween.

As described above, according to the rear surface tilting table of the embodiment, there can be realized the rear surface tilting table which is applicable to oblique cutting and vertical cutting by a simple structure.

Figure 3:
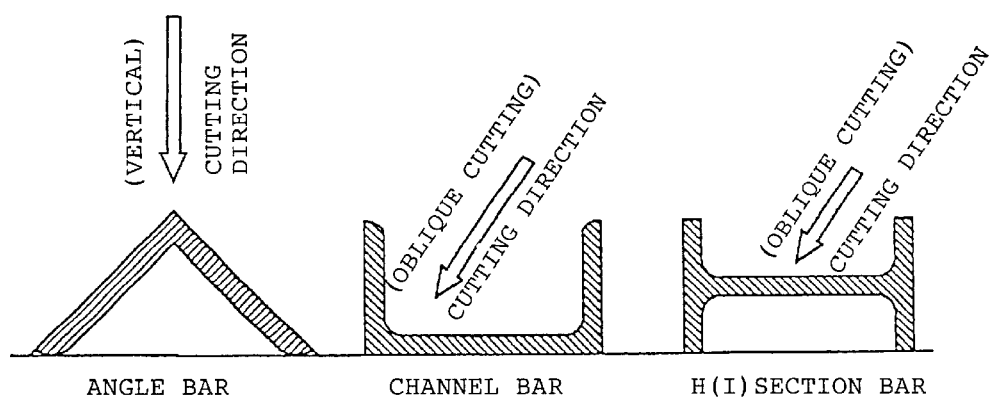
FIG. 3 is a view explaining a cutting method in the first embodiment in the first best mode.

While so-called down cut, in which the moving blade 91 is moved obliquely downward as shown in FIG. 3, is described in the above description, it is needless to say that the present invention is also applicable so-called up cut in which the moving blade 91 is moved obliquely upward.

Note that in this case it is sufficient only to return the table 29 to the waiting state by instantly moving it upward from the waiting state by rotating the eccentric shaft 41 in FIG. 14. For this purpose, it suffices only to dispose the eccentric side of the eccentric shaft 41 on a lower side in the waiting state in FIG. 14.

Second Embodiment

Prior to the description of the content of the second embodiment, the gist of the second embodiment will be described.

Figure 16:
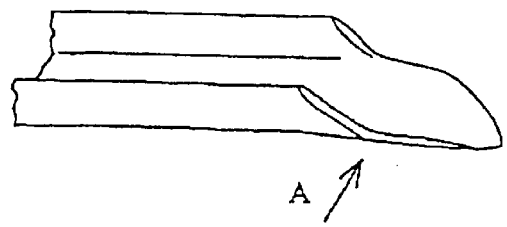
FIG. 16 is a view explaining a subject of the second embodiment in the first best mode.
Figure 17:
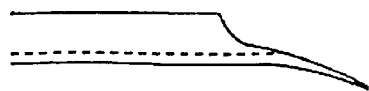
FIG. 17 is a view explaining the subject of the second embodiment in the first best mode.
Figure 18:
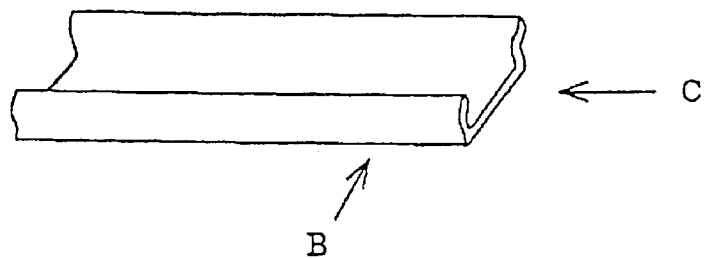
FIG. 18 is a view explaining the subject of the second embodiment in the first best mode.
Figure 19:
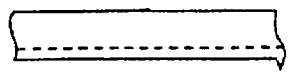
FIG. 19 is a view explaining the subject of the second embodiment in the first best mode.
Figure 20:
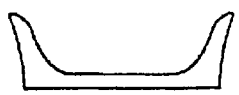
FIG. 20 is a view explaining the subject of the second embodiment in the first best mode.

A section bar extended by a rolling mill is divided into the length of a cooling bed on the outlet side of the rolling mill. The leading and tail ends of the rolled section bar is formed to a projecting shape referred to as a so-called "tongue" and liable to be sagged as shown in FIG. 16 and FIG. 17 (side elevational view when FIG. 16 is observed from an arrow A). Further, as shown in FIG. 18 to FIG. 20 (FIG. 19 is a side elevational view when FIG. 18 is observed from an arrow B and FIG. 20 is a side elevational view when FIG. 18 is observed from an arrow C), the cut surface of an intermediate divided portion of the section bar tends to expand (refer to FIG. 20) as well as has a catching portion (warp) called a "burr" (refer to FIG. 19) made thereto.

Figure 21:
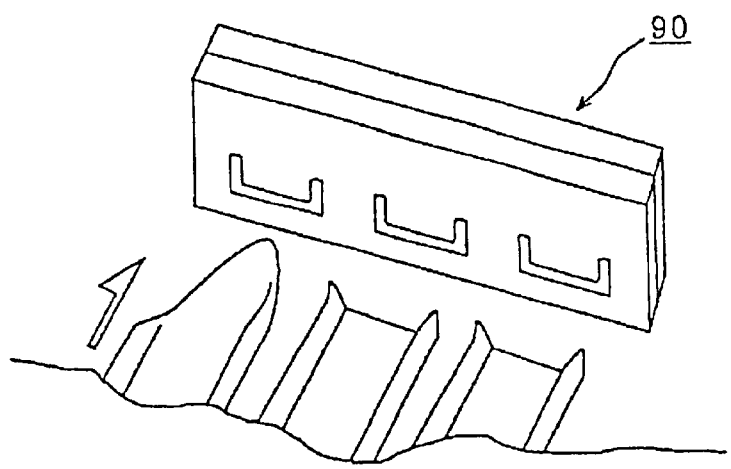
FIG. 21 is a view explaining the subject of the second embodiment in the first best mode.
Figure 22:
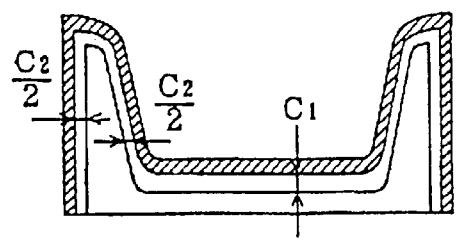
FIG. 22 is a view explaining the subject of the second embodiment in the first best mode.

It is required to arrange a plurality of section bars each having a deformed end side by side and to repeatedly insert them into the calipers of a blade set 90 as shown in FIG. 21. In the known technology which is in practical use at present, the clearances C1 and C2 (refer to FIG. 22) between the section bar to be cut and a caliper blade are very small and even a largest clearance is about 2 mm.

Figure 23:
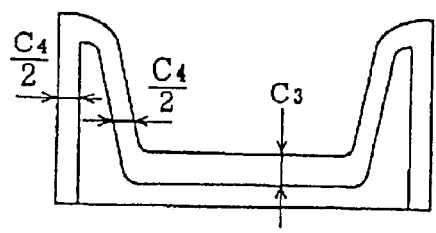
FIG. 23 is a view explaining the subject of the second embodiment in the first best mode.
Figure 24:
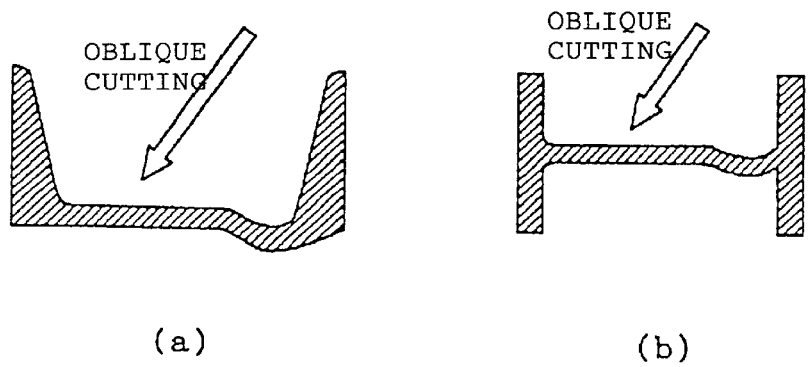
FIG. 24 is a view explaining the subject of the second embodiment in the first best mode.

However, it is very difficult to insert the leading end of the section bar into the caliper having the small clearances even if a trumpet-shaped guide is attached to the leading end of the section bar. Thus, such an arrangement cannot be practically employed to a hot section bar rolling line to which high productivity is required. To cope with this problem, the inventors examined a clearance which permitted a section bar to be smoothly inserted into a caliper for the realization of effective production. As a result of the examination, it was found that a clearance of about 10 mm was necessary (refer to FIG. 23, C3=C4=about 10 mm, note that FIG. 23 shows an increased clearance obtained by removing the slanted portion in FIG. 22). However, when oblique cutting is performed in the clearance of about 10 mm, a problem arises in that a flat horizontal portion (web) is deformed and is made unsuitable as a commodity.

To cope with the above problem, the second embodiment provides a blade set which permits the easy insertion of the extreme end of a section bar as well as prevents the deformation of the section bar when it is obliquely cut.

Figure 25:
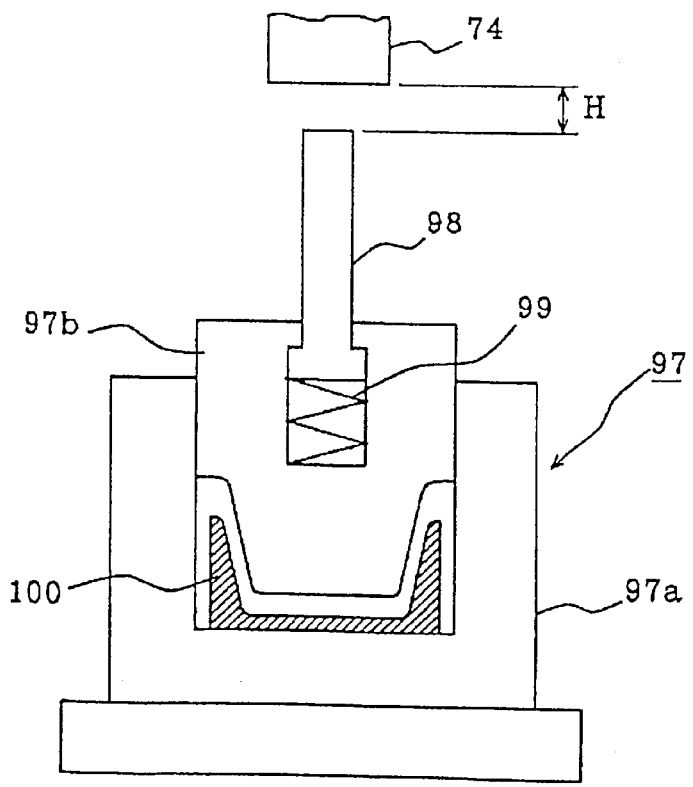
FIG. 25 is a view explaining a fixed blade of the second embodiment in the first best mode.

FIG. 25 is a view explaining the arrangement of a fixed blade 97 of the second embodiment. While the fixed blade having a single caliper formed thereat is shown in FIG. 25 to simplify explanation, actually a plurality of calipers are formed thereat as shown in the first embodiment. The arrangement of the fixed blade 97 will be described below based on FIG. 25.

The fixed blade 97 is composed of a first fixed blade 97a and a second fixed blade 97b, and the second fixed blade 97b is disposed so as to be movable in an up and down direction with respect to the first fixed blade 97a. Then, a gap acting as a caliper is formed at a portion where the first fixed blade 97a confronts the second fixed blade 97b. Further, a knocker 98 is attached to the second fixed blade 97b and a press spring 99 is interposed between the knocker 98 and the second fixed blade 97b.

Operation of the fixed blade 97 arranged as described above will be described. When the upper end of the knocker 98 is pressed by a ram 74, the second fixed blade 97b is moved downward and abutted against a section bar 100 and clamps it. When the knocker 98 is further lowered, the press spring 99 is contracted to that the section bar 100 is further pressed by the second fixed blade 97b.

In contrast, when the ram 74 is separated from the knocker 98, the second fixed blade 97b returns to its original position.

FIG. 26 to FIG. 29 are views explaining operation of a blade set 110 using the fixed blade 97. Note that while a moving blade 91 and the fixed blade 97 are disposed so as to be overlapped front and behind, in the figure they are disposed side by side on the right and left to make explanation easy.

Figure 26:
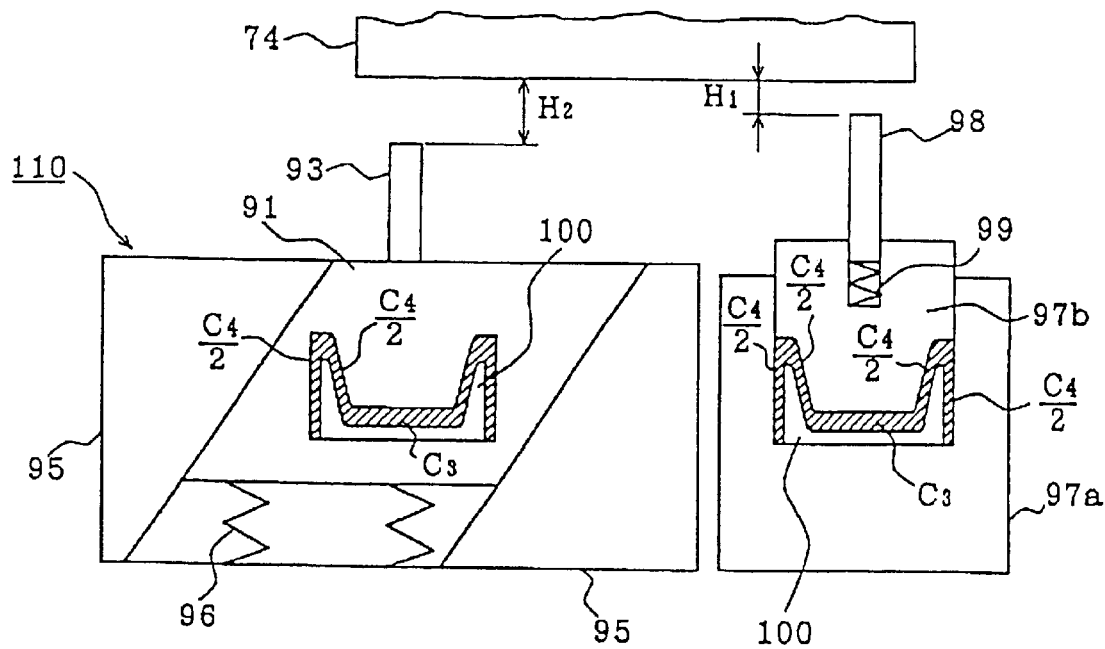
FIG. 26 is a view explaining operation of the second embodiment in the first best mode.
Figure 27:
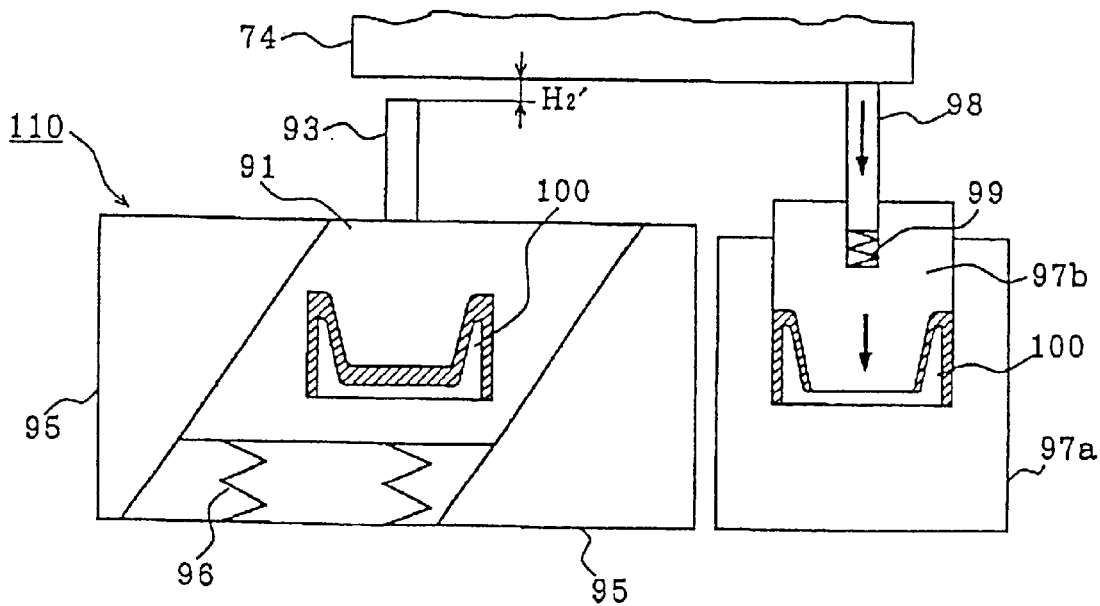
FIG. 27 is a view explaining the operation of the second embodiment in the first best mode.

In FIG. 26, H1 represents the distance between the ram 74 and the knocker 98 of the second fixed blade 97b, H2 represents the distance between the ram 74 and the knocker 93 of the moving blade 91, and the relationship H1<H2 is established. Further, the clearance of the caliper of the moving blade 91 is about as large as that shown in FIG. 23 so that the section bar 100 can be easily inserted therethrough.

Operation will be described below based on FIG. 26 to FIG. 29. FIG. 26 shows a state that the section bar 100 is inserted and cutting operation is not yet started (process 1).

Next, when a length is measured and the ram 74 is lowered as shown in FIG. 17, the knocker 98 of the second fixed blade 97b is pressed by the ram 74 and the second fixed blade 97b is lowered. Then, the second fixed blade 97b is abutted against a web so that the section bar 100 is clamped between the second fixed blade 97b and the first fixed blade 97a (process 2). Note that a gap H2' exists between the ram 74 and the knocker 93 of the moving blade 91 in this sate and the moving blade 91 does not yet start movement.

Figure 28:
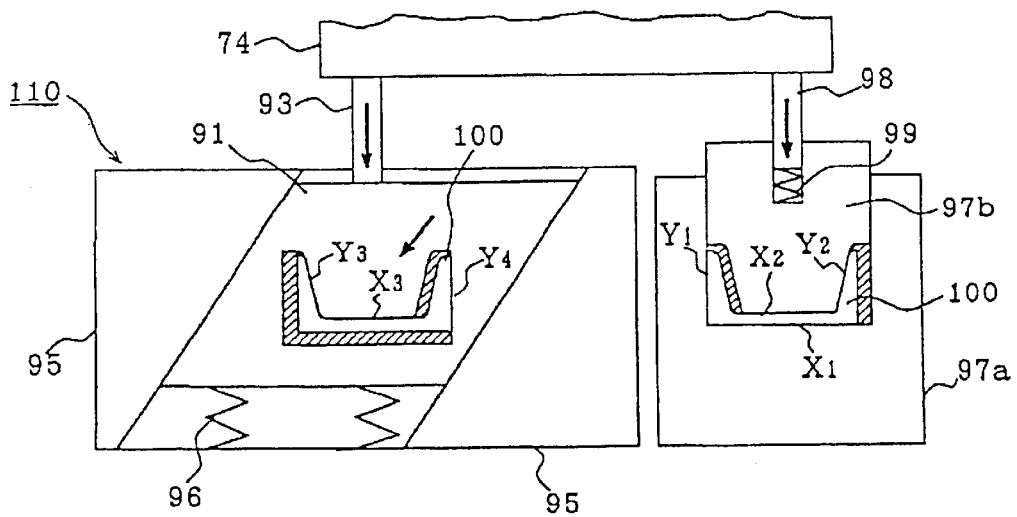
FIG. 28 is a view explaining the operation of the second embodiment in the first best mode.

Next, when the ram 74 is further lowered as shown in FIG. 28, since it is abutted against the knocker 93 of the moving blade 91, the moving blade 91 starts oblique movement and the caliper blade of the moving blade 91 is abutted against the section bar and the section bar 100 is pressed in an oblique direction thereby. As a result, the section bar 100 is moved in a horizontal direction by being pressed by the moving blade 91 and the relative position thereof to the fixed blade 97 is changed as shown in FIG. 28 (process 3). At the time, while the knocker 98 of the second fixed blade 97b is further pressed downward by the ram 74, the downward movement of the knocker 98 caused thereby is absorbed by the contraction of the press spring 99. Note that the press force at the time can be adjusted by adjusting the press spring 99.

In the state shown in FIG. 28, the clearance between the web of the section bar 100 and the X1 plane of the first fixed blade 97a and the clearance between the web and the X2 plane of the first fixed blade 97a are made to zero, whereby the deformation of the web of the section bar 100 can be prevented. Further, the clearances between the flange of the section bar 100 and the Y1 and Y2 planes of the first fixed blade 97a and the clearances between the flange and the Y3 and Y4 planes of the moving blade 91 are made to 2 mm or less, respectively.

Figure 29:
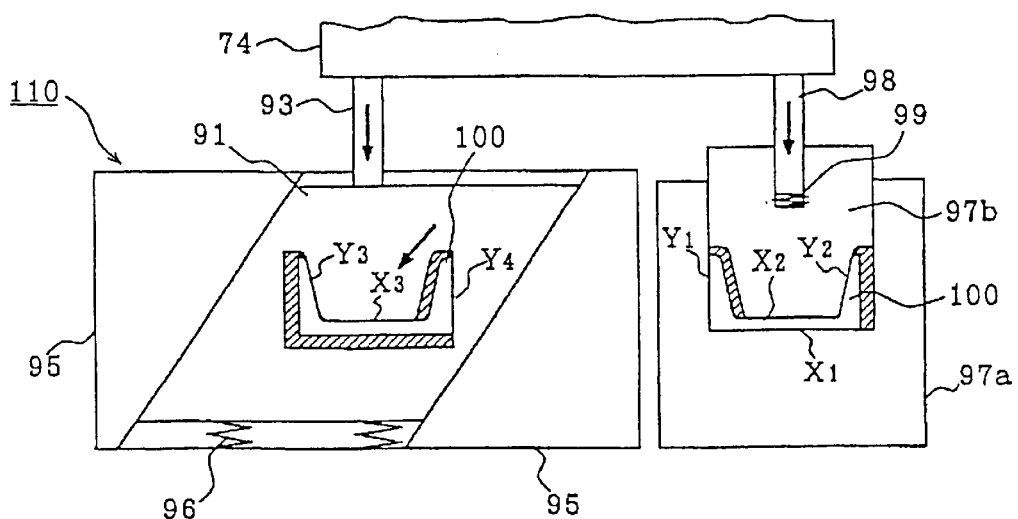
FIG. 29 is a view explaining the operation of the second embodiment in the first best mode.

Next, when the ram 74 is further lowered as shown in FIG. 29, the moving blade 91 obliquely travels and obliquely cuts the section bar 100 (process 4). Note that the downward movement of the knocker 98 at the time is absorbed by the press spring 99 similarly to the case shown in FIG. 28.

On the completion of the oblique cutting, both the moving blade 91 and the second fixed blade 97b return to the state shown in FIG. 26.

As described above, according to the blade set of the second embodiment, a section bar can be easily inserted into the calibers and easily cut obliquely without the occurrence of deformation thereto.

Third Embodiment

Figure 30:
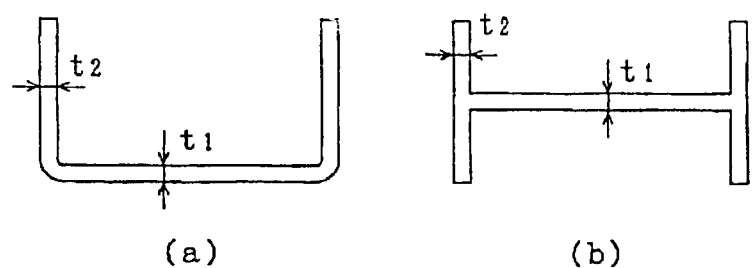
FIG. 30 is a view explaining a subject of the third embodiment in the first best mode.
Figure 31:
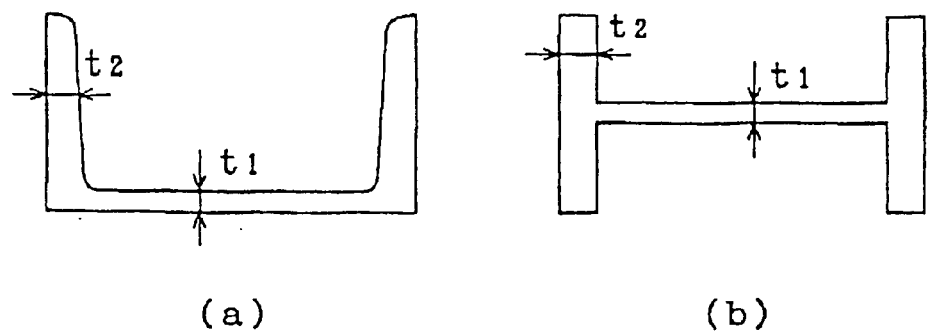
FIG. 31 is a view explaining a subject of the third embodiment in the first best mode.

Since a cold-formed section bar is made from a coil, the thickness $t_1$ of a web is equal to the thickness $t_2$ of a flange as shown in FIG. 30. However, in a section bar formed by hot rolling, the thickness $t_1$ of a web is different from the thickness $t_2$ of a flange and $t_1 < t_2$ as shown in FIG. 31.

Figure 32:
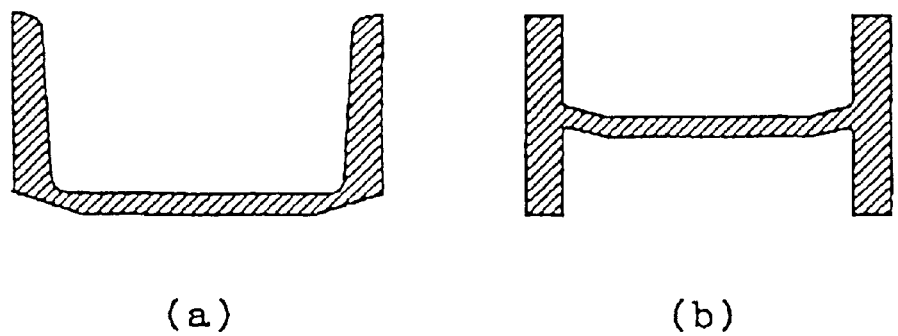
FIG. 32 is a view explaining the subject of the third embodiment in the first best mode.

When oblique cutting is started to both the surfaces of a section bar formed of a web and flanges having a different plate thickness at the same timing, the web is curved as shown in FIG. 32.

Figure 33:
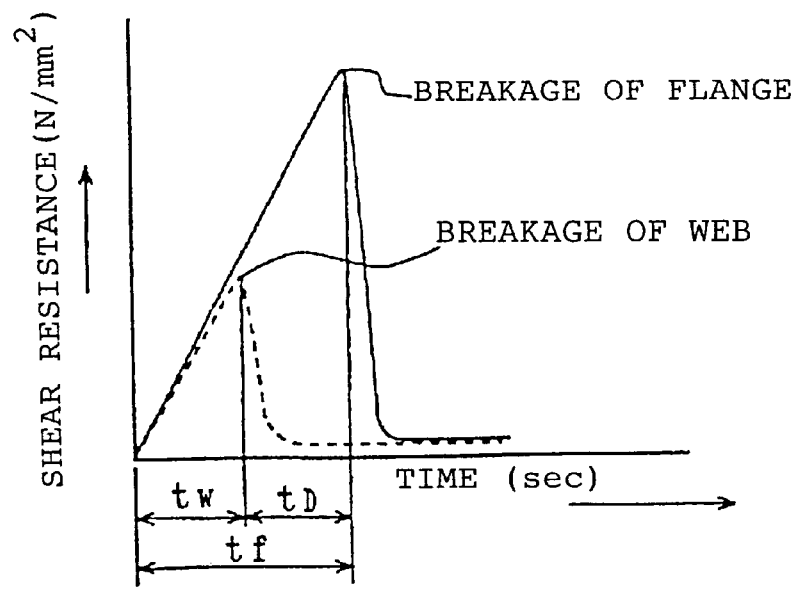
FIG. 33 is a view explaining the subject of the third embodiment in the first best mode.

The curve is caused by a time lag between the timings at which the cutting is finished on a web surface and flange surfaces. It will be described based on the graph of FIG. 33 showing the relationship between a shear resistance and a time. In FIG. 33, the shear resistance is shown by the vertical axis and the time is shown by the horizontal axis.

In FIG. 33, $t_w$ represents a time necessary to break the web and $t_f$ represents a time necessary to break the flanges. When the web surface and the flange surfaces are simultaneously started to be cut as shown in FIG. 33, the breakage of the thicker flanges (substantial completion of cut) is delayed by a time $t_D$. Thus, since the flanges are sheared in a state that the web is not restricted, the web is curved by the force acting on the flange from the blades at the time. In other words, the web is deformed by the amount of movement of the moving blade which moves in contact with the web surface during the time $t_D$.

Figure 34:
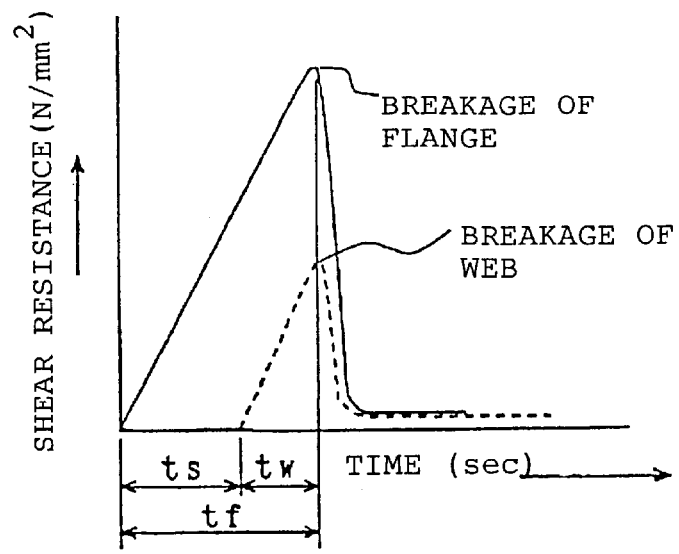
FIG. 34 is a view explaining the third embodiment in the first best mode.

To cope with the above problem, in the third embodiment, the curving of the web is prevented by breaking it and the flanges at the same timing. That is, as shown in FIG. 34, a time at which the cut of the web is started is delayed from a time at which the cut of the flange is started by a time $t_s$ so that the web and the flanges are broken at the same timing.

Figure 35:
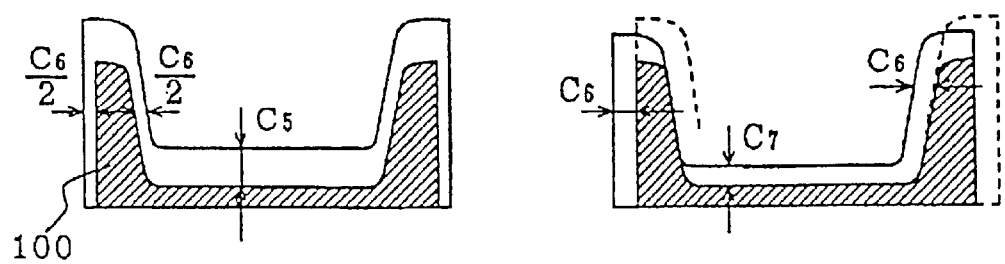
FIG. 35 is a view explaining the third embodiment in the first best mode.
Figure 36:
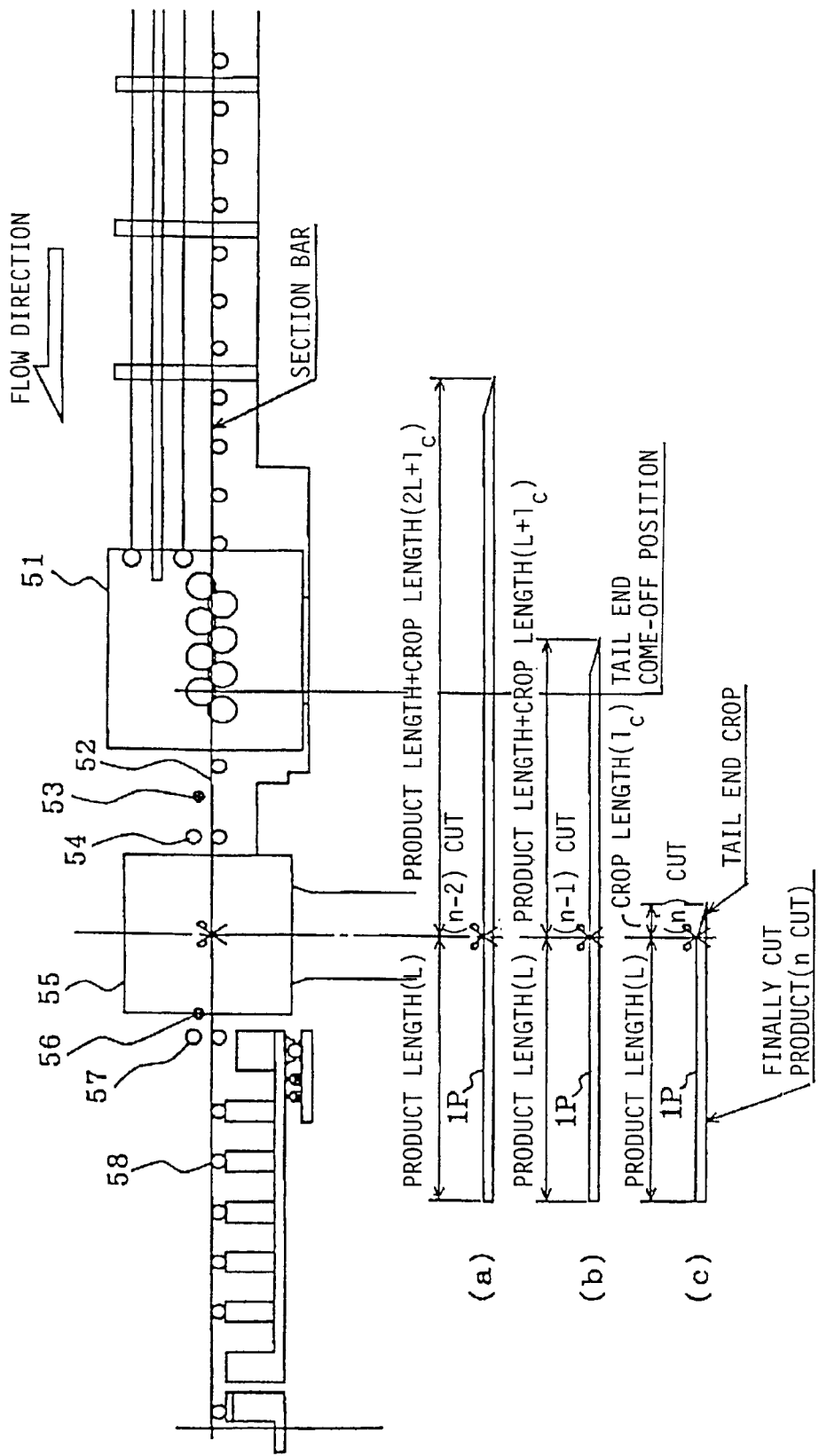
FIG. 36 is a view explaining the outline of an inline straightening/traveling cutting system in an ordinary section bar rolling line.
Figure 37:
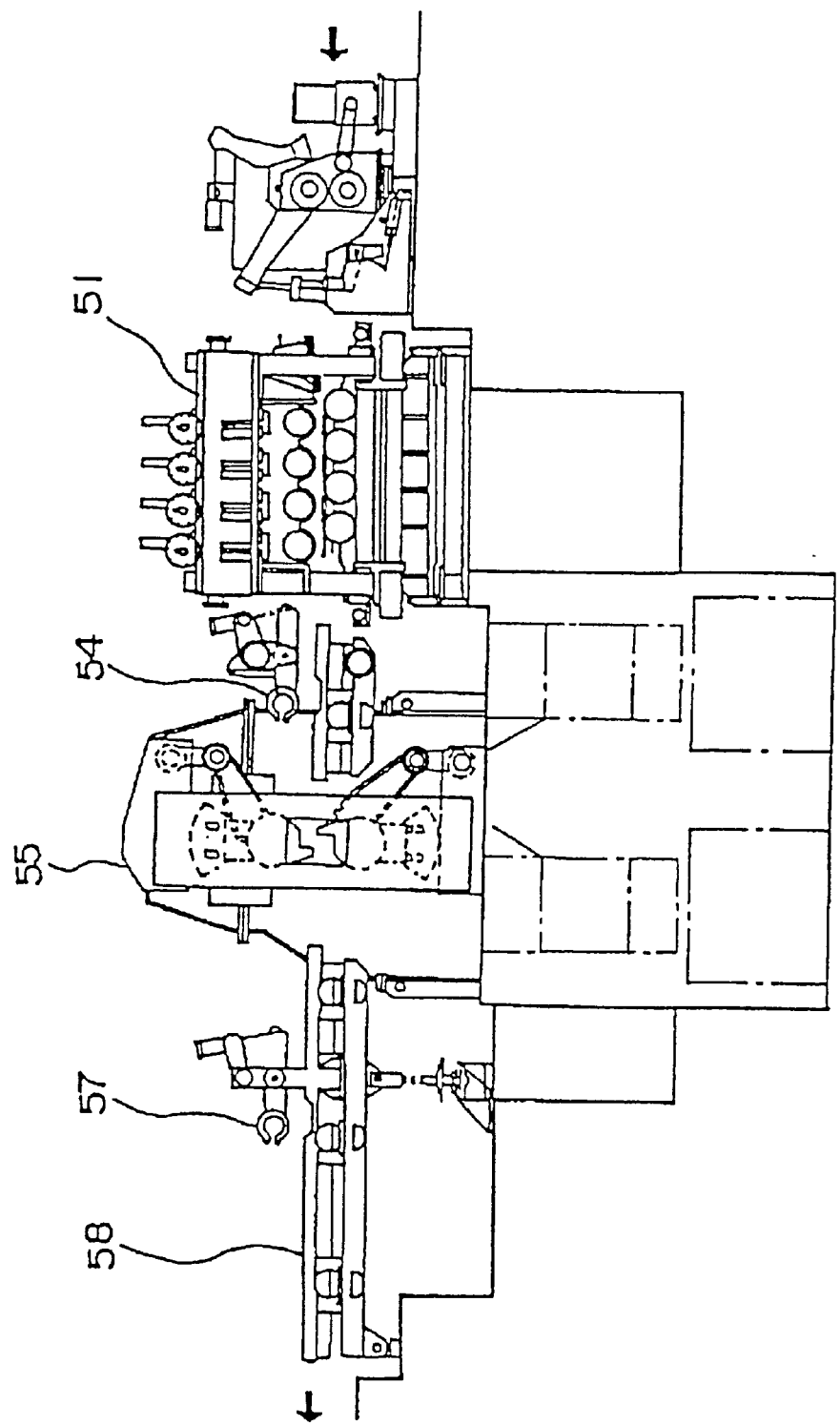
FIG. 37 is a view explaining an apparatus of a conventional inline straightening/traveling cutting system.

FIG. 35 is a view explaining a moving caliper blade of the embodiment, wherein FIG. 35(a) shows a state just before cutting operation is performed after a section bar 100 is inserted into the caliper blade, and FIG. 35(b) shows a state just before the cut of the flanges of the section bar 100 is started.

As shown in FIG. 35, the relationship between the clearances $C_6$ of the flanges and the clearance $C_5$ of the web is $C_6 < C_5$, and the web has a clearance of $C_7$ at the time the cut of the flanges is started. Then, $C_7$ is set to a value corresponding to the time lag $t_s$ so that the web and the flanges are broken at the same timing.

According to the time lag cutting of the embodiment, a section bar formed by hot rolling and having a web and flanges having a different thickness can be obliquely cut without curving the web. Accordingly, a hot rolled section bar product of high quality, which is located between a band saw and a friction saw, can be stably manufactured regardless of the shape thereof.

As described above, in the present invention, since oblique cutting is performed by clamping a plurality of corrected section bars by the inlet and outlet side introduction pinch rollers and tilting the rear surface tilting table in the moving direction of the blades in synchronism therewith, the multiple section bars can be corrected and cut without deforming cut surfaces and without causing dispersion in the lengths of finally cut products.

Further, the two first rollers, which are disposed by being separated from each other by a predetermined distance, and the second roller, which are interposed therebetween, are provided and section bars are clamped by the first rollers and the second roller, even if the thicknesses of the section bars clamped thereby are dispersed, all the section bars can be tightly clamped.

As a result, the respective section bars are transported at the same velocity and the dispersion of the cut lengths of the section bars can be suppressed to a small value.

Further, since the distance between the two first roller is adjustable, section bars can be properly clamped in accordance with the types thereof.

The distance between the inlet and outlet side introduction pinch rollers is set shorter than the length obtained by subtracting the distance the section bars travel until leading ends thereof are clamped by the outlet side introduction pinch roller after the section bars reach the position of the outlet side introduction pinch roller from the length of products. Accordingly, the section bars can be clamped by the upstream or downstream pinch roller in accordance with product lengths without fail.

Since the stopper is provided for regulating the rolling draft of the second roller, the rolling draft when the section bars are clamped by the first rollers and the second roller can be easily regulated to a predetermined amount.

The section bars are clamped by the inlet side introduction pinch roller before they come off the straightening apparatus and fed to the multiple traveling section bars cutting machine, and when the leading ends of the section bars are fed up to the position of outlet side introduction pinch roller, the section bars are clamped by the outlet side introduction pinch roller as well as the inlet side introduction pinch roller is released. Accordingly, the section bars can be clamped by any one of the inlet and outlet side introduction pinch rollers in accordance with the lengths of the products as well as the inlet side introduction pinch roller can be prevented from clamping the tail end crops and the adverse affect to the inlet side introduction pinch roller caused by the clamp of the tail end crops can be prevented.

Since the direction in which the rear surface tilting table is tilted can be regulated in accordance with the moving direction of the blades of the multiple traveling section bars cutting machine, various types of section bars such as angle steel, channel steel, H-steel, rail and the like can be obliquely cut in accordance with the shapes thereof.

The fixed blade is composed of at least two blades each constituting the caliper as well as these two blades are relatively movably arranged, and section bars are cut by the moving blade after they are clamped by the two blades.

Accordingly, the clearance of the caliper can be set to a large size, whereby a job for inserting a large number of section bars into a plurality of calipers can be carried out easily so that multiple section bars can be effectively corrected and cut.

Further, since the section bars are cut with a time lag by setting the clearances of the calipers so that the cut of the respective portions of the section bars is completed simultaneously, section bars whose respective portions have a different thickness can be cut without being curved.

Second Best Mode

A method of cutting section bars according to the second best mode, which uses a fixed blade and a moving blade each having calipers formed in accordance with the cross-sectional shapes of the section bars and moves the moving blade obliquely with respect to the section bars, is characterized in that the longitudinal sides of the section bars (for example, the flange surfaces of the section bars) are pressed against the longitudinal sides of the calipers of the fixed blade in the initial cutting preprocess of one cycle of cutting.

The one cycle of cutting is a process from a step of setting prior to cutting, which includes the setting and adjustment of the clearances in calipers, to a step of cutting section bars and returning them to original states.

Therefore, the present invention is characterized in that the section bars are restricted or fixed by pressing the longitudinal sides thereof against the longitudinal sides of the calipers of the fixed blade each one cycle of cutting. With this operation, the clearances in the calipers are automatically adjusted to zero or to a minimum possible value at all times, whereby excellent cut surfaces can be obtained without deformation because the backlash of the section bars in the calipers is eliminated.

The fixed blade is composed of an upper blade and an lower blade which are divided into at least two portions, and the upper blade is lowered in a cutting preprocess next to the above process, thereby clamping upper and lower surfaces (for example, web surfaces) of the section bars between the upper blade and the lower blade. That is, in a first cutting method, it is shown that the fixed blade may be of a non-dividing-type similar to a conventional blade. Further, in a second method, further a dividing-type fixed blade is used and the upper blade thereof is movably arranged. As a result, the upper and lower surfaces of section bars are clamped between the upper blade and a fixed lower blade to thereby restrict and fix not only flange surfaces but also web surfaces. With this arrangement, the section bars are reliably and tightly held and better cut surfaces can be obtained.

The first cutting method can be embodied by using a cutting apparatus including a fixed blade and a moving blade each having calipers formed in accordance with the cross-sectional shapes of section bars and overlapped with each other front and behind, a moving blade press-down means and a guide means for moving the moving blade in an oblique direction with respect to the section bars, wherein the cutting apparatus is characterized by comprising a presser means for pressing the longitudinal sides of the section bars against the longitudinal sides of the calipers of the fixed blade. The presser means is driven each one cycle of cutting.

The second cutting method uses a cutting apparatus arranged such that the fixed blade is composed of an upper blade and a lower blade which are divided into at least two portions along the side of the caliper shape thereof, the lower blade is fixed and the upper blade is coupled with the press-down means through an elastic member such as a spring or the like.

Further, according to a most preferable mode of the cutting apparatus of the present invention, the apparatus comprises a presser device, a fixed blade device and a moving blade device which are disposed near to and in parallel with each other, wherein the presser device includes a first knocker slidable in a block in an up and down direction and a slider fitted to the first knocker through a taper surface and slidable in a horizontal direction so as to press the longitudinal side of a section; the fixed blade device includes a second knocker slidable in a block in an up and down direction and a fixed lower blade and an upper blade which are divided into at least two portions along the side of a caliper formed in accordance with the cross-sectional shape of the section, the upper blade being coupled with the second knocker through an elastic member such as a spring or the like; and the moving blade device includes a third knocker slidable in a block in an up and down direction, a moving blade having a caliper formed in accordance with the cross-sectional shape of the section and pressed downward by the third knocker and guide blocks for guiding the movement of the moving blade in an oblique direction. In the above arrangement, the heights of the first to third knockers are lowered in this sequence.

The cutting apparatus is used by being disposed just below, for example, the ram of a cutting machine. Since the first to third knockers are sequentially pressed downward with a time lag by lowering the ram, the following three processes an be carried out in the one cycle of cutting.

(1) A precutting process in which the longitudinal side of the section is pressed against the longitudinal side of the caliper of the fixed blade;

(2) A precutting process in which the upper and lower surfaces of the section are clamped by the moving upper blade and the fixed lower blade of the fixed blade; and (3) A cutting process in which the section is sheared by the moving blade.

Therefore, the cutting apparatus is very compact and less expensive as well as can effectively execute the second method.

Figure 45:
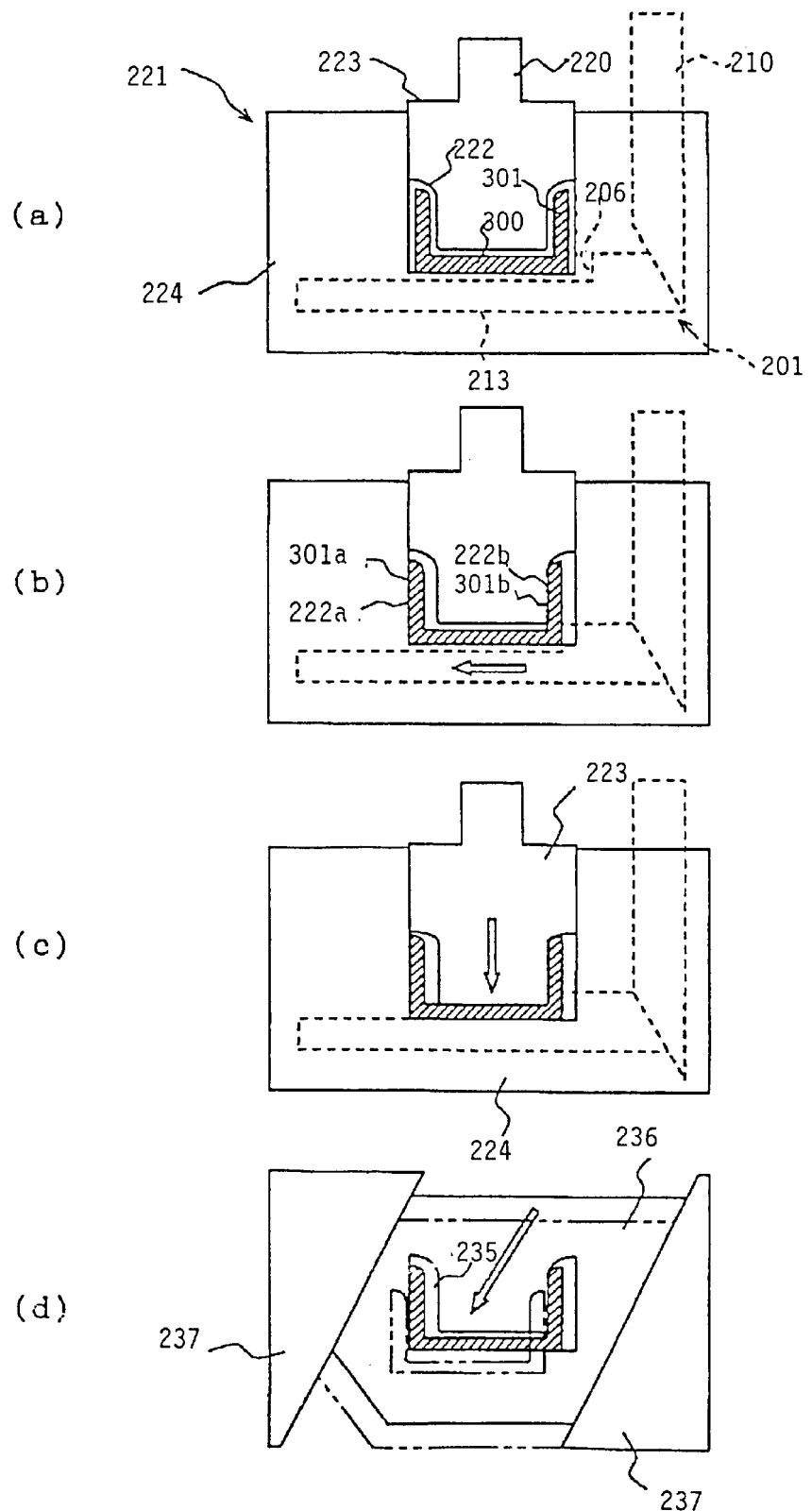
FIG. 45 is a view showing a cutting principle of the second best mode.

Further, a cutting principle of the present invention will be described based on FIG. 45. FIG. 45(*a*) shows the positioning of a portion to be cut of a section, (b) shows an initial cutting preprocess (c) shows a next cutting preprocess and (d) shows the state in a cutting process. In the figures, numeral 300 denotes a section to be cut and numeral 201 denotes a presser means composed of a knocker 210 and a slider 213. Numeral 221 denotes a dividing-type fixed blade which is divided into two portions along the side of a caliper 222, that is, into an upper blade 223 and a lower blade 224. Numeral 220 denotes the knocker of the upper blade 223, numeral 236 denotes a moving blade having a caliper 235 formed thereat. The moving blade 236 moves obliquely downward along guide blocks 237 and 237 with respect to the section 300.

As shown in FIG. 45(*a*), the section 300 as the member to be cut is inserted into the caliper 222 of the fixed blade 221 and the caliper 235 of the moving blade 236 so that the portion to be cut thereof is positioned. Next, as shown in (b), the slider 213 is moved in a horizontal direction by pressing the knocker 210 of the presser means 1 downward, presses the flange 301 of the section 300 through the shoulder 216 thereof and presses the flange surfaces thereof against the longitudinal sides 222*a* and 222*b* of the caliper 222. As a result, the clearances in the caliper between the flange surfaces of the section 300 and the longitudinal sides of the caliper 222 are made to approximately zero at the pressed portion, whereby the flanges of the section can be restricted or fixed. Next, as shown in (c), the upper blade 223 of the fixed blade 221 is pressed downward by the knocker 220, thereby clamping the web surface of the section 300 between the upper blade 223 and the lower blade 224. After the section 300 is fixed in the caliper 222 of the fixed blade 221 as described above, the section 300 is cut by moving the moving blade 236 obliquely downward along the guide blocks 237 and 237 as shown in (d).

To obtain an excellent cut surface in the oblique cutting (shearing) of a section, it is important to cause a blade to pass through the plate thicknesses of the respective surfaces, which are perpendicular to each other, in minimum distances. In particular, in a section having two or more surfaces perpendicular to each other such as channel steel, H-steel, I-steel, rail and the like, the section is placed in an ordinary attitude and the directional angle of the cutting blade is determined so that it passes through the plate thicknesses of the respective perpendicular surfaces in a minimum distance. However, since the thicknesses of the respective surfaces are not always the same, the cutting blade is designed so that the difference between the breaking times of the respective surfaces having a different thickness is minimized.

When the cutting blade designed as described above is used and a section is restricted or fixed before it is cut, a cut surface of high quality can be obtained without the phenomenon of deformation of the shape of the cut surface, burring, sagging and plucking.

Figure 46:
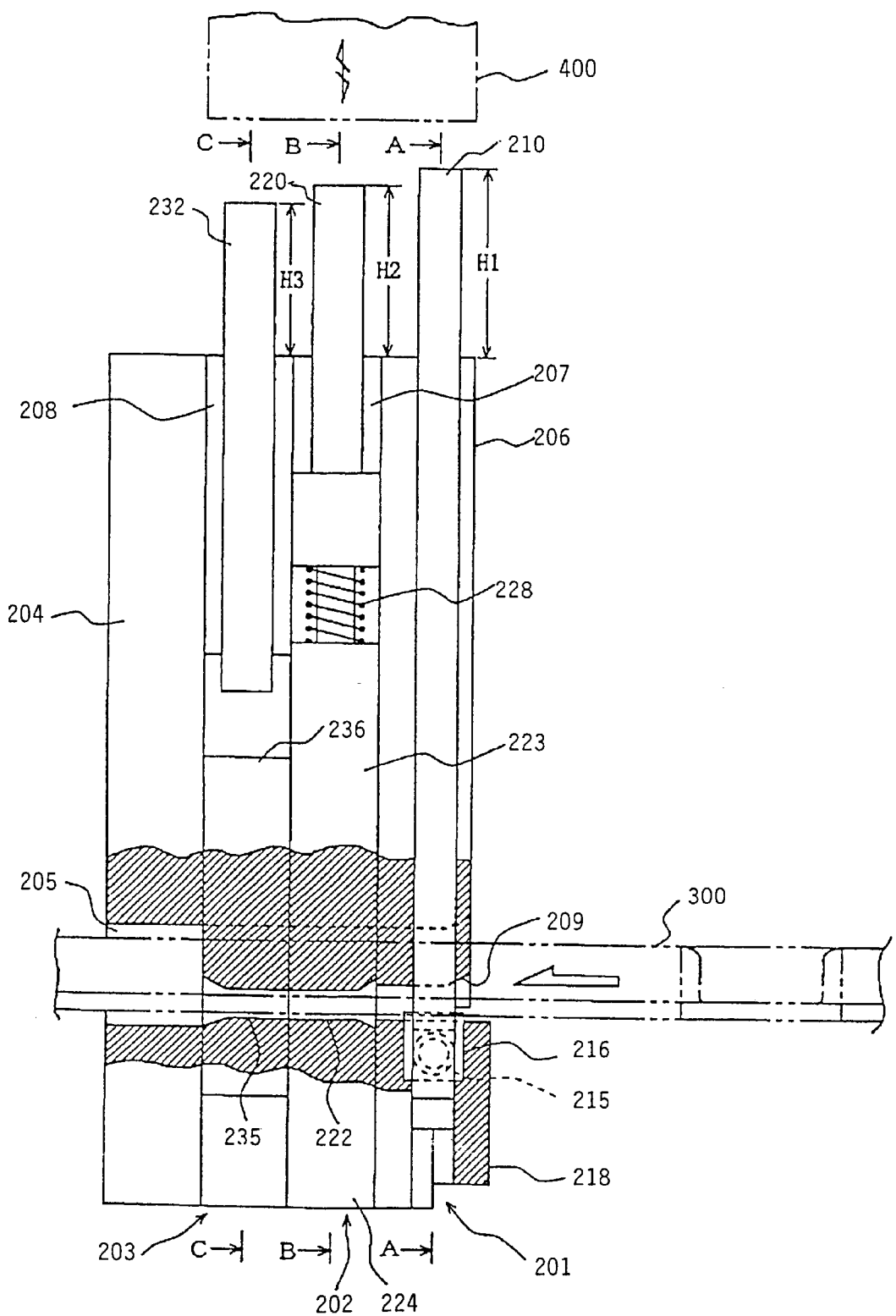
FIG. 46 is a side elevational view, partly in cross-section, of a cutting apparatus of the second best mode.
Figure 47:
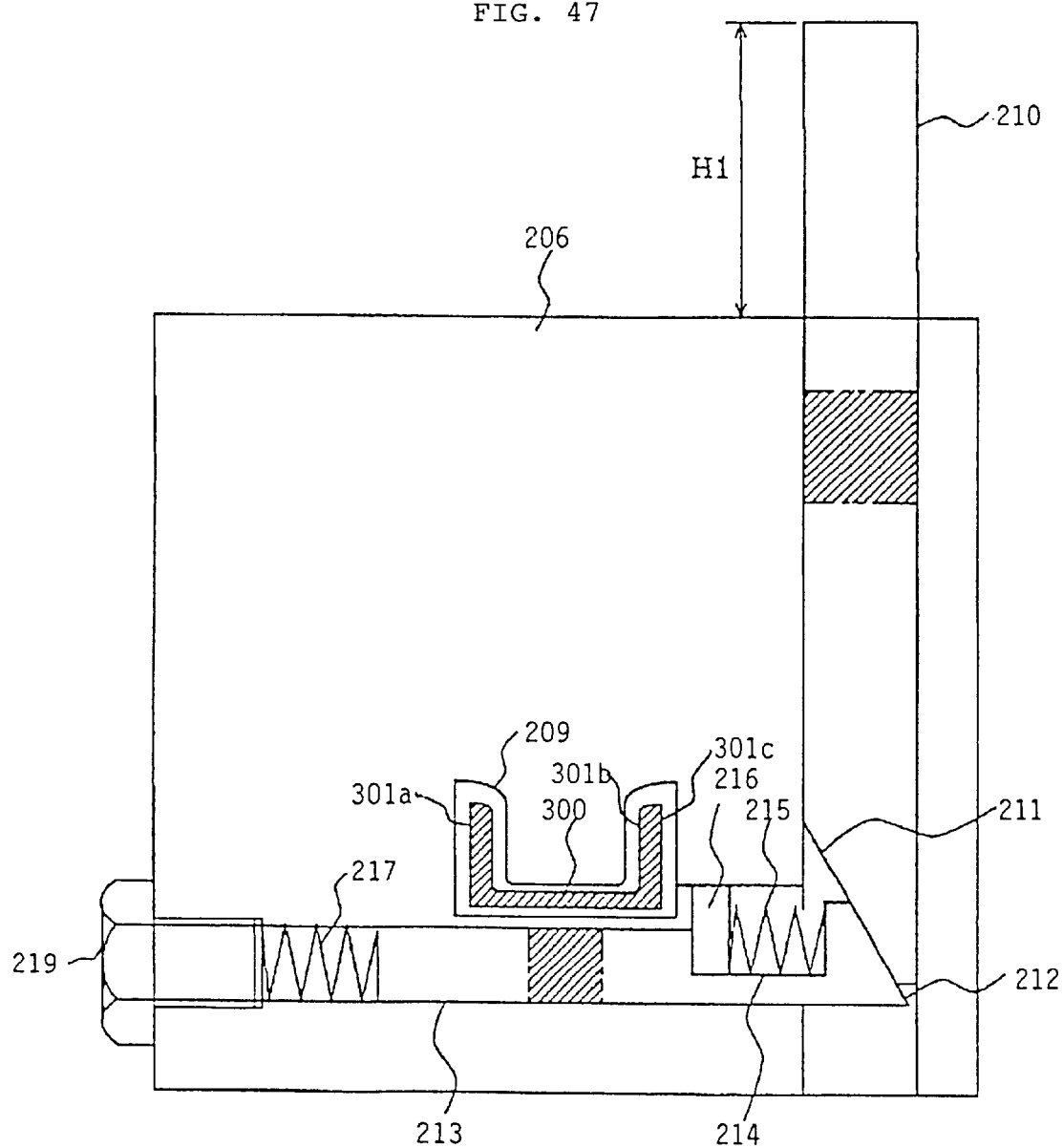
FIG. 47 is a front sectional view taken along the line A—A of FIG. 46.
Figure 48:
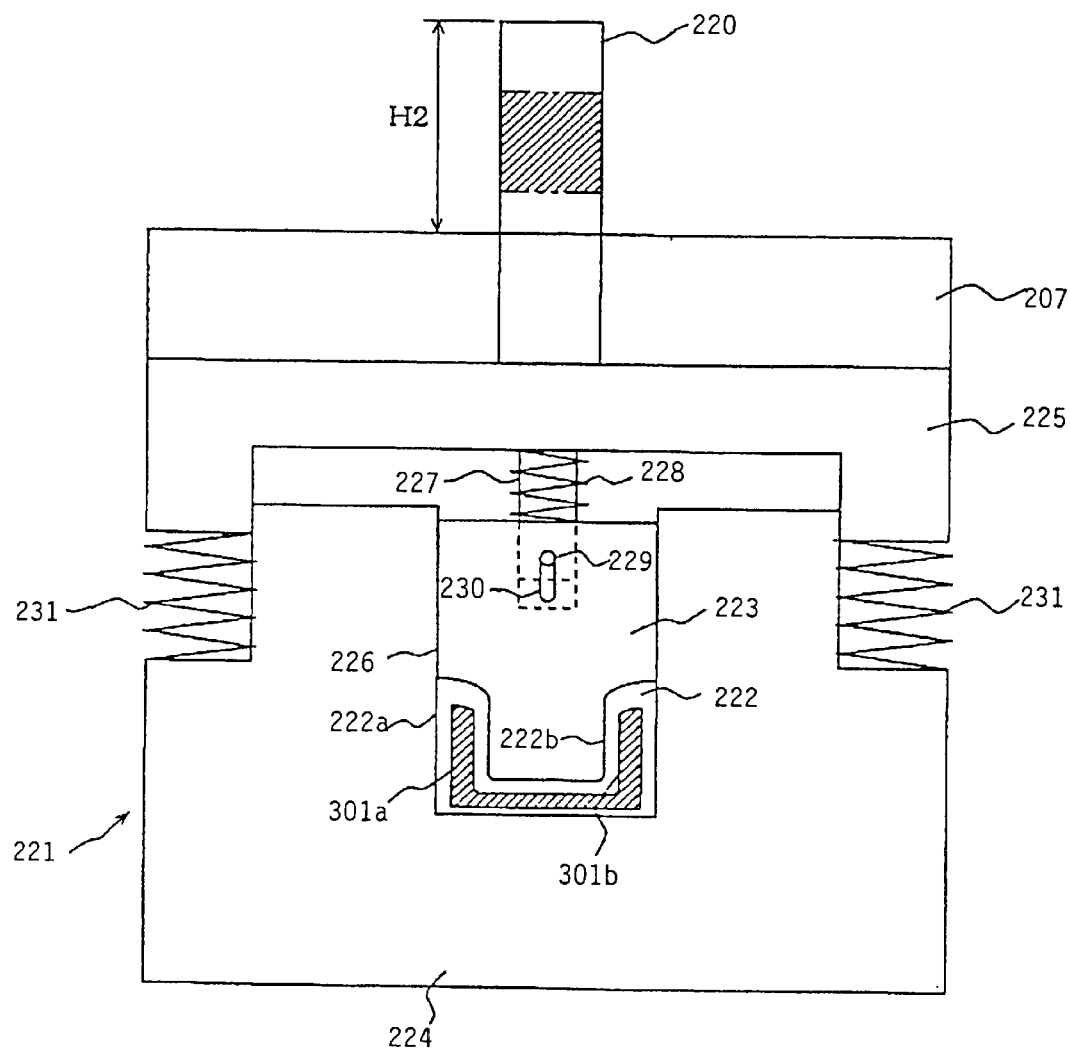
FIG. 48 is a front sectional view taken along the line B—B of FIG. 46.
Figure 49:
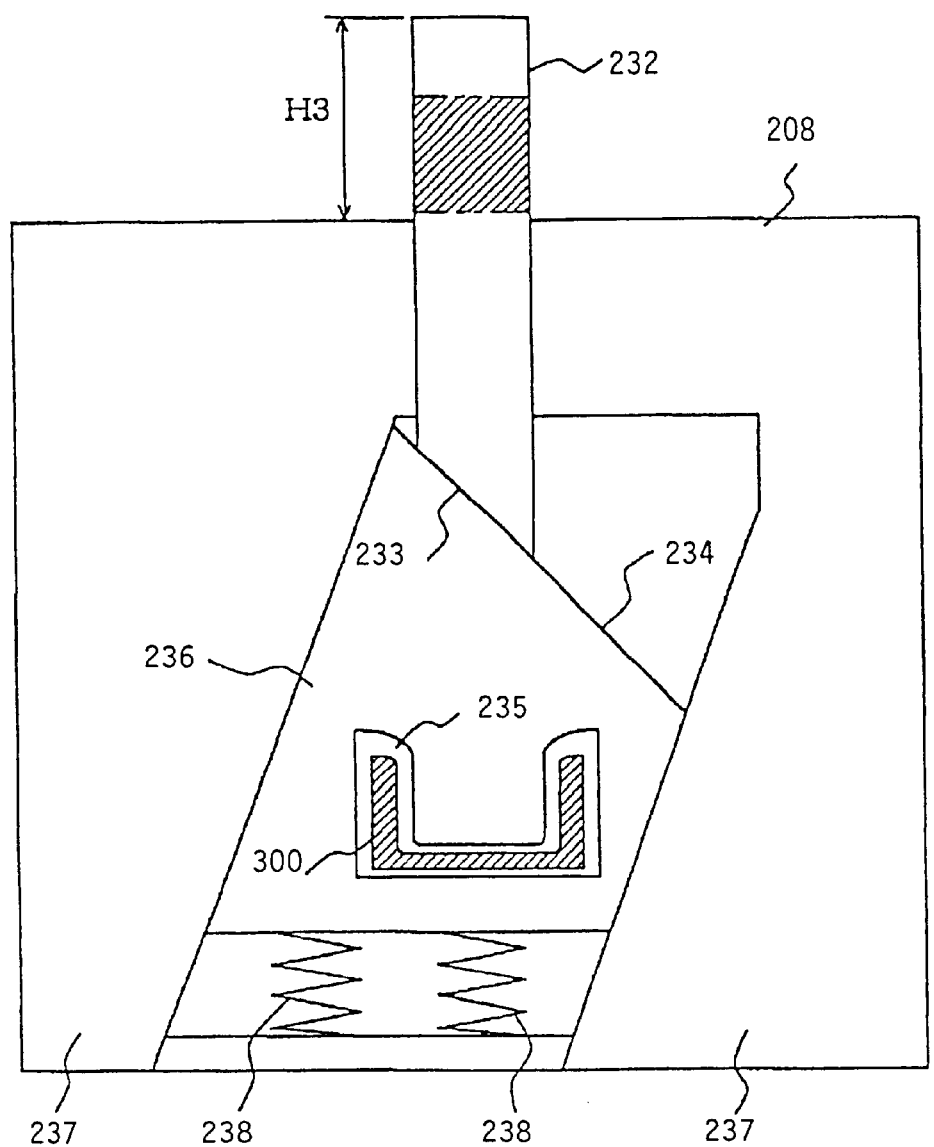
FIG. 49 is a front sectional view taken along the line C—C of FIG. 46.

FIG. 46 is a side elevational view, partly in cross section barshowing the outline of the cutting apparatus of the present invention, FIG. 47 to FIG. 49 are front sectional views along the line A—A, line B—B, and line C—C of FIG. 45, respectively. Here, a cutting apparatus for a channel steel is exemplified.

In the cutting apparatus of the present invention, the presser device 201, a fixed blade device 202 and a moving blade device 203 are disposed near to and in parallel with each other sequentially from upstream of the section 300 as the member to be cut with resect to the direction from which it is supplied as shown in FIG. 46. In the figure, numeral 204 denotes a fixed block having an outlet 205 of the section 300. The blocks 206, 207 and 208 of the respective devices are fixed to the fixed block 204 through not shown passing-through bolts integrally therewith. Further, numeral 400 denotes, for example, the ram of the cutting machine.

The presser device 201 comprises the block 206, the first knocker 210, a slider 213, a presser metal 216 and a return spring 217 of the slider 213. The block 206 has a caliper 209 or an opening formed thereat and having a size through which the leading end and tail end of the section 300 sufficiently pass; the first knocker 210 is slidable in the block 206 in an up and down direction and has a square cross-section; the slider 213 is fitted to the first knocker 210 on taper surfaces 211 and 212, slidable in a horizontal direction and has a squire cross section; and the presser metal 216 is disposed in the recess 214 of the slider 213 through a spring 215 for pressing the outside surface of the flange 301 of the section 300. Numeral 218 denotes a patch disposed to assemble the slider 213, the press metal 216 and the spring 215, and numeral 219 denotes a bolt for adjusting the return spring 217.

The fixed blade device 202 comprises the second knocker 220, which is slidable in the block 207 in an up and down direction and has a square cross section, the upper blade 223 and the lower blade 224, which are divided into at least the two portions along the sides (here, the longitudinal sides on both the sides and the bottom side) of the caliper 222 of the fixed blade 221 and a three-pronged-fork-shaped presser metal 225 connected to the second knocker 220. The upper blade 223 is inserted into a cutout 226, which is cut out along the sides of the caliper of fixed lower blade 224 formed to a block shape, so as to slide upward and downward, and coupled with the center rod 227 of the presser metal 225 through a spring 228. Numeral 229 denotes a coupling pin inserted into a slot 230 for raising the upper blade 223. Numeral 213 denotes a return spring for the presser metal 225 and the upper blade 223.

The moving blade device 203 comprises a third knocker 232, the moving blade 236, a guide block 237 and the return spring 238 of the moving blade 236. The third knocker 232 is slidable in the block 208 formed integrally with the guide blocks of the moving blade and has a square cross section; the moving blade 236 is fitted to the knocker 232 on taper surfaces 233 and 234 and has the caliper 235 formed thereto; and the guide block 237 guides the movement of the moving blade 236 in an oblique downward direction.

The respective calipers 209, 222 and 235 have the same shape and the same size, the size being sufficient to pass the leading end and tail end of the section bar 100 therethrough. Further, when the heights of the respective knockers 210, 220 and 232 projecting from the blocks are represented by H1, H2 and H3, respectively, the projecting heights are differently set to satisfy the relationship of H1>H2>H3. As the ram 400 is lowered, the different knocker heights permit the first, second and third knockers to be sequentially pressed downward with a time lag. Therefore, when the first knocker 210 is pressed downward first, since the slider 213 fitted thereto on the taper surfaces 211 and 212 is moved horizontally leftward in FIG. 47, the outside surface 301c of the right flange of the section 300 is pressed by the press metal 216 which is urged by the spring 215. As a result, the outside surface 301a of the left flange and the inside surface 301b of the right flange come into contact with the longitudinal sides 222a and 222b of the caliper 222 so that the clearances therebetween are approximately made to zero. As a result, the flanges 301 of the section 300 on both the sides thereof are restricted or fixed in the caliper 222 of the dividing-type fixed blade 221. Further, the flanges 301 are also restricted or fixed in the caliper 209 of the block 206 having the same relation.

When the ram 400 is further pressed downward, since the second knocker 220 is pressed downward next, the upper blade 223, which is coupled with the center rod 227 of the presser metal 225 through the spring 228, is pressed downward through the spring 228, whereby the surfaces of the web 302 of the section 300 are clamped between the upper blade 223 and the fixed lower blade 224 from upper and lower sides thereof. With this operation, not only the flanges 301 of the section 300 but also the web 302 thereof are restricted or fixed in the dividing-type fixed blade 221.

The above operation is carried out in the process before the section 300 is cut.

When the ram 400 is pushed downward successively, the third knocker 232 is pressed downward finally. As a result, the moving blade 236, which is fitted on the taper surfaces 233 and 234, is pressed obliquely downward along the guide blocks 237, whereby the section 300 is obliquely sheared between the moving blade 236 and the fixed blade 221. Then, when the ram 400 is lifted finally, the moving blade 36 and the third knocker 232 are returned to their original positions by the return spring 238, the upper blade 223, the presser metal 225 and the knocker third 220 are returned to their original positions by the return spring 231, and the slider 213 and the first knocker 210 are returned to their original positions by the return spring 217, respectively.

The one cycle of cutting is completed as described above. Therefore, since the section is obliquely cut by the moving blade 236 after the flange surfaces and the web surfaces thereof are restricted or fixed in the caliper 222 of the fixed blade 221 by the presser device 201 in each cutting cycle, a very excellent cut surface can be obtained. Thus, even if the dimensional accuracy of a section is relatively bad as in a hot-rolled section, a cut surface of high quality can be obtained because the clearance of the caliper in the fixed blade is automatically adjusted to zero or to a minimum possible value as well as the section can be cut in a short time by the compact and less expensive cutting apparatus.

Figure 50:
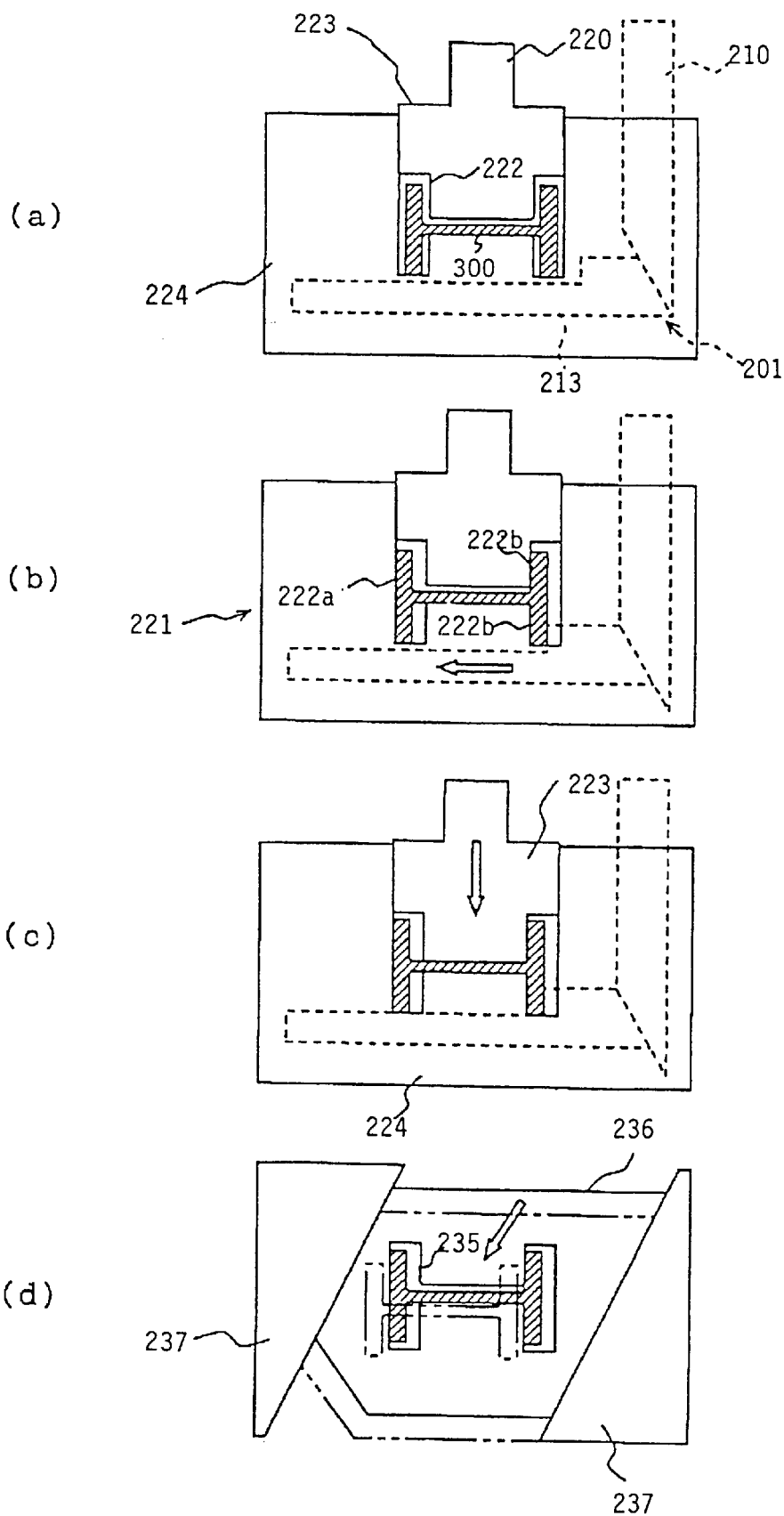
FIG. 50 is a view explaining cutting operation in H-steel in the second best mode.

FIG. 50 is a view explaining cutting operation in a H-steel. In this case, the fixed blade 221 is divided into the upper blade 223 and the lower blade 224 along the side of the lower half portion of the caliper 222 thereof. Operation and working-effect are the same as those of the channel steel. Further, in an I-steel and a rail, it is sufficient to divide the fixed blade into at least two portion according to the case of the H-steel.

Note that, in the present invention, even if the fixed blade 221 is not divided into the two portions mentioned above and it is arranged as a conventional non-dividing-type fixed blade, a sufficient effect can be achieved by only pressing the longitudinal sides of a section against the longitudinal sides of the caliper thereof by the presser device 201 before it is cut. Further, while the slider 213 is driven by the first knocker 210, it may be driven by a cylinder or the like in place of the knocker 210. However, the apparatus can be simply arranged and operation can be performed at a reliable timing by the use of the knocker because a single drive source can be commonly used.

As described above, according to the present invention, since the longitudinal sides of a section is pressed against the longitudinal sides of the caliper of the fixed blade each cutting cycle before the section is cut and thereafter the section is cut, a cut surface of high quality can be obtained. Further, since the clearance in the caliper can be automatically adjusted to zero or to a minimum possible value at all times by the action for pressing the section, even a hot-rolled section can be excellently cut.

Further, since the fixed blade is divided into at least the two portions of the upper blade and the lower blade along the side of the caliper thereof, the upper blade is arranged movable and the lower blade is fixed so as to clamp the upper and lower surfaces of a section by the upper blade and the lower blade, the section can be strongly and stably restricted or fixed in the caliper, whereby a more excellent cut surface can be obtained.

Third Best Mode

A multiple section bars cutting method according to the third best mode is a cutting method of simultaneously shearing a plurality of section bars using a fixed blade and a plurality of moving blades and moving the plurality of moving blades in oblique directions with respect to the respective section bars, wherein the method is characterized in that the moving directions of the plurality of moving blades are divided into left obliquely downward directions and right obliquely downward directions. The fixed blade preferably includes a plurality of calipers formed in accordance with the cross-sectional shapes of the section bars. The respective moving blades include calipers similar to those of the fixed blade.

Further, a multiple section bars cutting apparatus according to the third best mode is characterized by comprising a fixed blade, a plurality of moving blades overlapped to the fixed blade and guide blocks for regulating the moving directions of the plurality of moving blades to left obliquely downward directions and right obliquely downward directions. In this case, when an even number of section bars are simultaneously cut, the plurality of moving blades are symmetrically disposed right and left. Further, the left-half-portion of the plurality of moving blades is disposed so as to move in parallel left obliquely downward directions and the right-half-portion thereof is disposed so as to move in parallel right obliquely downward directions regardless of that the number of the section bars is even or odd.

The present invention is characterized in that the plurality of moving blades are disposed such that the moving directions thereof (obliquely cutting directions of the section bars) draw a Japanese character "ha" (ハ). It is contemplated to disposed them such that they are moved to draw a Japanese character "kawa" (川) according to common sense, the difference between their dispositions results in a large difference in external force acting on the shearing blades (fixed blade and moving blades). This will be described with reference to FIG. 56. The figure shows a case of oblique cutting by character "kawa" in (a) and a case of oblique cutting by character "ha" in (b). In the figure, numerals 401a and 401b denote section bars as members to be cut, numeral 402 denotes a fixed blade having calipers 402a and 402b, and numerals 403a and 403b denote moving blade having calipers 404a and 404b, respectively.

Figure 56:
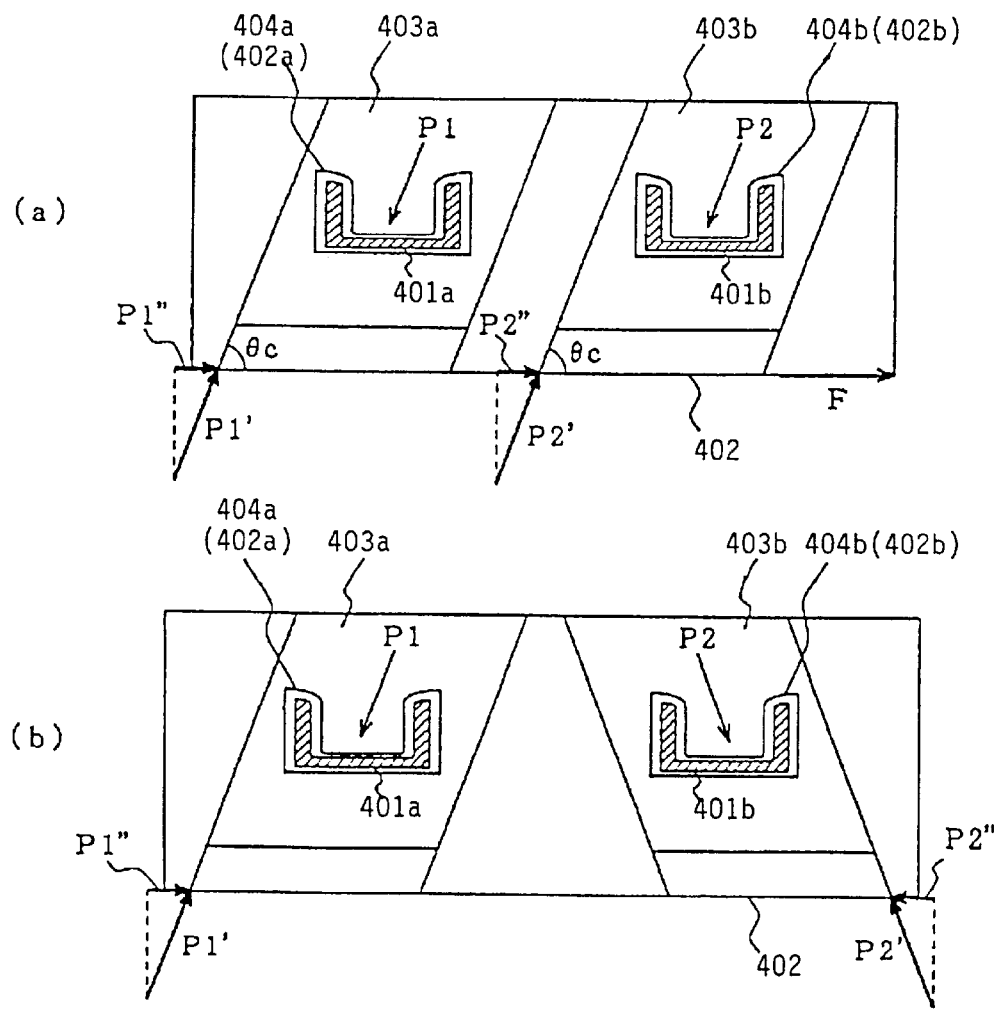
FIG. 56 is a view explaining a difference of action force due to the different disposition of a shearing blade in the third best mode.

In FIG. 56, in the case of the oblique cutting by character "kawa" shown in (a), forces P1 and P2 necessary to shear the section bars 401a and 401b produce reaction forces P1' and P2', which are as large as the forces P1 and P2, on the fixed blade 402 through the section bars 401a and 401b. Horizontal components P1" and P2" made by the reaction forces P1' and P2' are represented by the following formula, when an obliquely cutting angle is represented by θc.

$$P1"+P2"=(P1+P2)\cos θc=2P·\cos θc$$

Thus, the sum of the horizontal components acts on the searing blades as an external force F in a horizontal direction.

In contrast, in the oblique cutting by character "ha" shown in FIG. (b), the action and reaction of force are the same as those in the oblique cutting by character "kawa". However, since the section bars 401a and 401b are obliquely cut in an opposite direction, the horizontal component P1" and the horizontal component P2" cancel each other, from which the following formula results.

$$P1"+P2"=0$$

That is, no external force F is produced to the shearing blades in the horizontal direction.

The relationship between the external force F and the number n of section bars to be cut is as follows.

oblique cutting by character "kawa"

2 pieces $F=2·P·\cos θc$ 3 pieces $F=3·P·\cos θc$ n pieces $F=n·P·\cos θc$ oblique cutting by character "ha"

2 pieces $F=0$ 3 pieces $F=P·\cos θc$ n pieces $F=o$ or $P·\cos θc$

As described above, in the oblique cutting by character "kawa", the external force F is proportional to the number n of section bars to be cut. In contrast, in the oblique cutting by character "ha", since section bars are divided by n/2+n/2 or (n−1)/2+[(n−1)/2+1], when n is an even number, the external force F is zero, whereas, even if n is an odd number, the external force F is P·cos θc at the largest which corresponds to only one section.

Incidentally, in an example that two channel steels of 200×90 are simultaneously cut, the following result can be obtained when the two systems are compared with each other, supposing that the obliquely cutting angle θc=45°. oblique cutting by character "kawa"

$$P1 = P2 \quad 200 \text{ TON}$$
$$P1' = P2' \quad 200 \text{ TON}$$
$$P1'' \quad 141.4 \text{ TON}$$
$$P2'' \quad = P1''$$
$$F = P1'' + P2'' \quad 282.4 \text{ TON}$$

oblique cutting by character "ha"

$$P1 = P2 \quad 200 \text{ TON}$$
$$P1' = P2' \quad 200 \text{ TON}$$
$$P1'' \quad 141.4 \text{ TON}$$
$$P2'' \quad = -P1''$$
$$F = P1'' + P2'' \quad 0$$

That is, in the oblique cutting by character "kawa", the shearing blades must be tightly fixed and held so that they are not out of order with respect to a maximum of 70% of the horizontal force of an obliquely cutting force. If backlash is caused by looseness and the like, excellent cutting cannot be maintained.

In contrast, in the oblique cutting by character "ha", the horizontal force is zero, or it is sufficient to fix and hold the shearing blades so that they are not out of order with respect to the horizontal force of a maximum of 70% of obliquely cutting force of one piece of a section at the largest. Thus, in the oblique cutting by character "ha", design is easy, few problems arises as to fixing and holding as well as a cut surface can be maintained in high quality.

Figure 52:
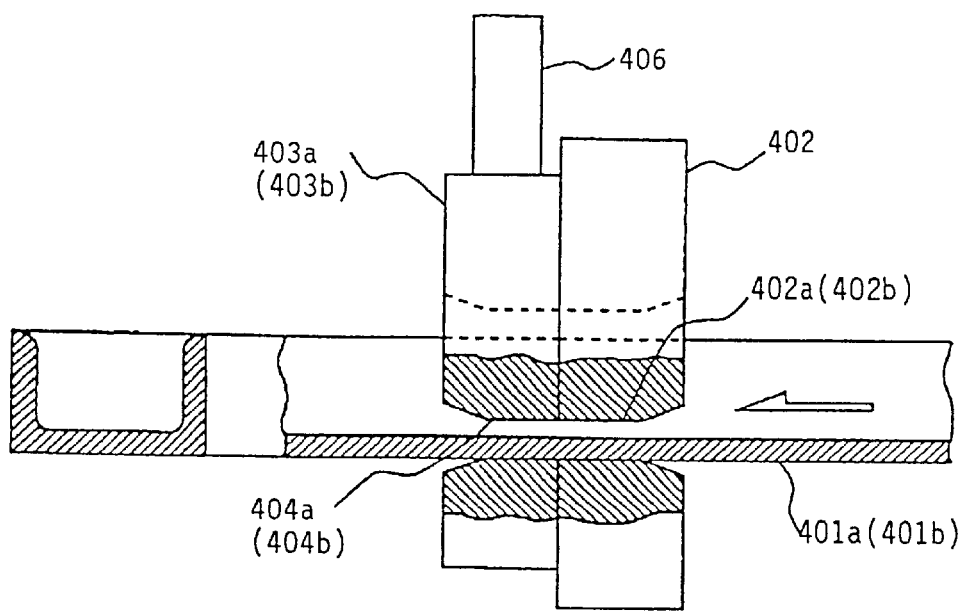
FIG. 52 is a side elevational view, partly in cross section, of a multiple section bars cutting apparatus in the third best mode.
Figure 53:
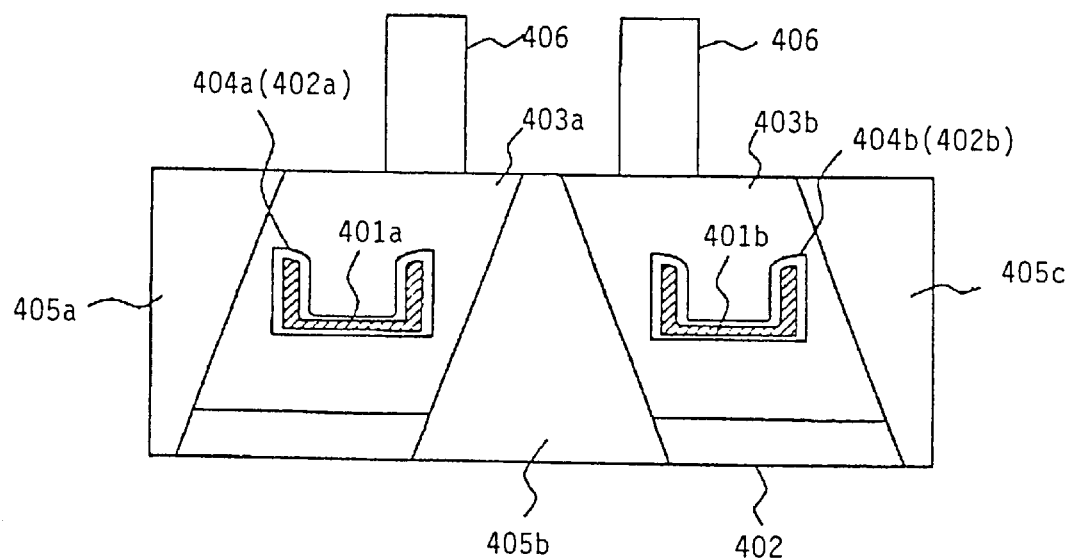
FIG. 53 is a front elevational view of FIG. 52.

FIG. 52 is a side elevational view, partly in cross section barshowing the outline of the multiple section bars cutting apparatus of the present invention and FIG. 53 is a front elevational view. A multiple section bars cutting apparatus for two channel steels is exemplified here.

In FIG. 52 and FIG. 53, numerals 401a and 401b denote the section bars as the members to be cut and they are inserted into the cutting apparatus in parallel with each other in an ordinary attitude. Numeral 402 denotes the fixed blade having the calipers 402a and 402b formed in accordance with the cross-sectional shapes of the section bars. Numerals 403a and 403b denote the moving blades including the calipers 404a and 404b which have the same shapes and sizes as those of the calipers 402a and 402b of the fixed blade 402. The left moving blade 403a moves in a left oblique downward direction and the right moving blade 403b moves in a right oblique downward direction, respectively. Numeral 405a, 405b and 405c denote guide blocks for regulating the moving directions of the moving blades 404a and 404b. Numeral 406 denotes knockers for moving the respective moving blades 403a and 403b. The knockers are simultaneously pressed downward by, for example, the ram (not shown) of a cutting machine.

The fixed blade 402 is fixed to a not shown apparatus main body. The respective moving blades 403a and 403b are disposed symmetrically right and left and in front of the fixed blade 402 and moved in predetermined directions between a plurality of guide blocks 405 fixed to the fixed blade 402, respectively. The movements are performed by pressing the knockers 406 downward by the ram of the cutting machine. With this operation, the two section bars 401a and 401b can be simultaneously sheared. Further, since no horizontal force F is caused when they are sheared as described above, the backlash and the like arising between the fixed blade 402 and the moving blade 403a and 403b can be easily and reliably suppressed. As a result, a cut surface of high quality can be obtained as well as multiple section bars can be effectively cut.

Figure 54:
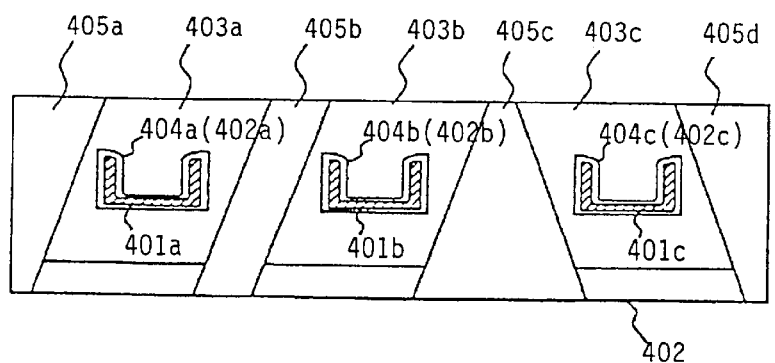
FIG. 54 is a front elevational view showing an example of shearing blades disposed to three section bars in the third best mode.
Figure 55:
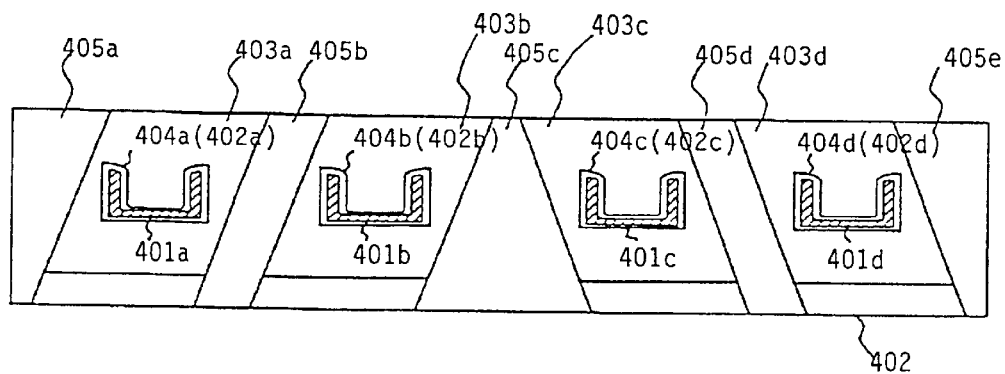
FIG. 55 is a front elevational view showing an example of shearing blades disposed to four section bars in the third best mode.

FIG. 54 shows an example the shearing blades disposed to three section bars, and FIG. 55 shows an example the shearing blades disposed to four section bars.

When the number of the section bars 401a, 401b and 401c as the members to be cut are an odd number, the moving blade 403a and 403b on any one of the sides (for example, left side) are regulated by the guide blocks 405a, 405b and 405c so that they are moved in parallel left oblique downward directions, whereas the right moving blade 403c is regulated by the guide blocks 405c and 405d so that it is moved in a right oblique downward direction similarly to FIG. 53. Therefore, in this case, it is sufficient to take the obliquely cutting force applied to the one piece of the left section 401a into consideration as the horizontal external force to the shearing blades.

When the number of the section bars 401a, 401b, 401c and 401d is an even number, the moving blade 403a, 403b, 403c and 403d are disposed in the character "ha" which is symmetrical right and left. That is, the guide blocks 405a, 405b, 405c, 405d and 405e are disposed so that the moving blades 403a and 403b in a left group are moved in parallel left oblique downward directions and the moving blades 403c and 403d in right group are moved in parallel right oblique downward directions. In this case, no horizontal external force is produced to the shearing blades.

Note that while the respective moving blades may be disposed to draw the character "ha" side by side, this arrangement is disadvantage in that the size of the apparatus is increased as a whole because the lateral width of the blades are increased.

As described above, according to the present invention, since a plurality of section bars are simultaneously cut by using the fixed blade and the plurality of moving blades and dividing the moving directions of the respective moving blades into the left obliquely downward directions and the right obliquely downward directions, the horizontal external forces acting on the shearing blades can be cancelled. Accordingly, multiple section bars can be effectively cut in high quality because the looseness, backlash and the like between the shearing blades can be easily and reliably suppressed.

Fourth Best Mode

A multiple section bars cutting method according to the fourth best mode is a cutting method of using a fixed blade having a plurality of calipers formed in accordance with the cross-sectional shapes of the section bars and a plurality of moving blades each having a caliper similar to that of the fixed blade and cutting the plurality of section bars substantially at the same time by moving the plurality of moving blades to the respective section bars in oblique directions, wherein the method is characterized in that shearing force is reduced by performing the oblique motions of the plurality of moving blades (movements of the respective moving blades in oblique downward directions) with a time lag.

Further, a multiple section bars cutting apparatus according to the fourth best mode comprises a fixed blade having a plurality of calipers formed in accordance with the cross-sectional shapes of the section bars, a plurality of moving blades overlapped to the fixed blade and each having a caliper similar to that of the fixed blade, and a press-down means provided with each of the plurality of moving blades, wherein the heights of the respective knockers of the press-down means are sequentially lowered.

In the present invention, since the section bars are sheared between the plurality of moving blades and the fixed blade by sequentially moving the moving blade obliquely, a shearing machine requires only a force necessary to shear one section regardless of the number of section bars to be cut, whereby the increase of the shearing machine in size can be avoided.

Figure 57:
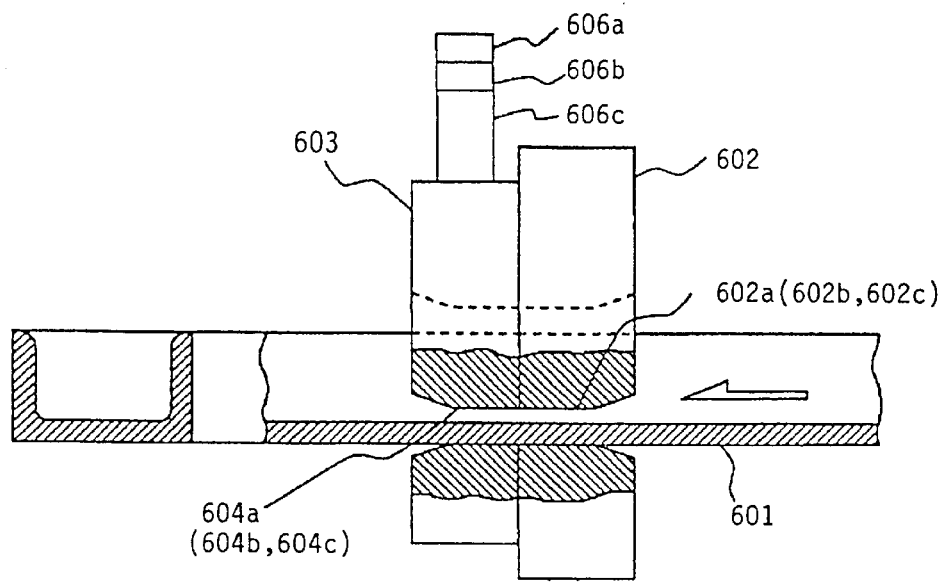
FIG. 57 is a side elevational view, partly in cross section, of a multiple section bars cutting apparatus in the fourth best mode.
Figure 58:
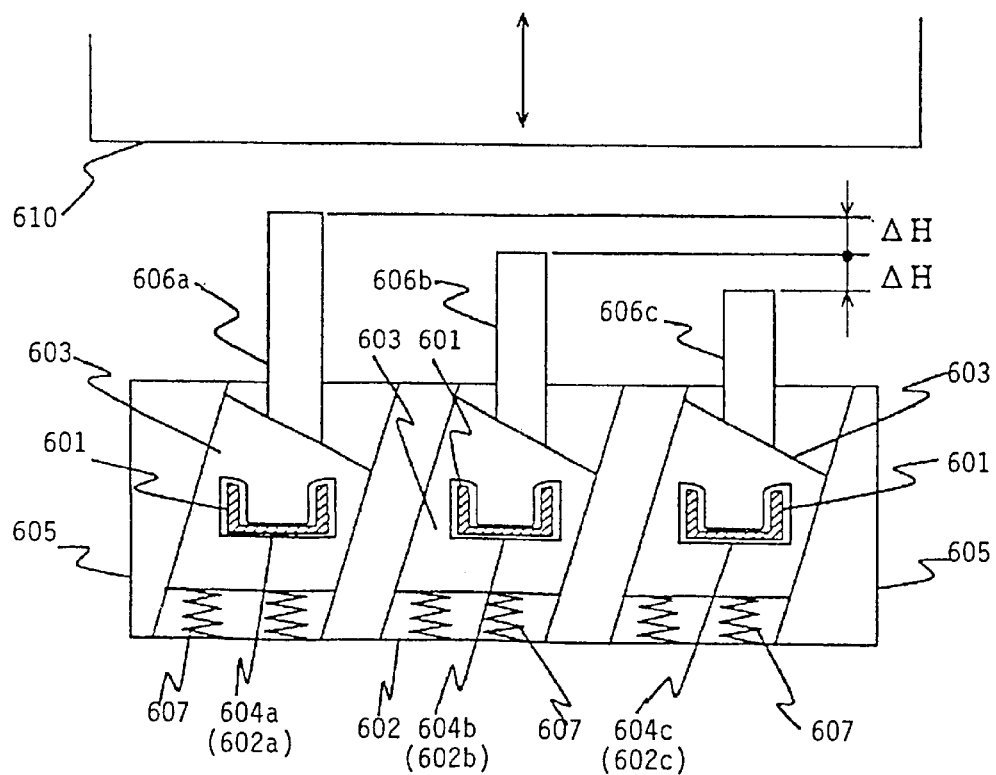
FIG. 58 is a front elevational view of FIG. 57.

FIG. 57 is a side elevational view, partly in cross section, of the outline of the multiple section bars cutting apparatus of the present invention and FIG. 58 is a front elevational view. A multiple section bars cutting apparatus for three channel steels is exemplified here.

In FIG. 57 and FIG. 58, numeral 1 denotes section bars as members to be cut and the section bars are inserted into the cutting apparatus in parallel with each other in an ordinary attitude. Numeral 602 denotes a fixed blade to which calipers 602a, 602b and 602c are formed in accordance with the cross-sectional shapes of the section bars. Numeral 603 denotes divided moving blades having calipers 604a, 604b and 604c which have the same shapes and the same sizes as those of the calipers 602a, 602b and 602c of the fixed blade 602. The moving blades 603 move in obliquely downward directions, respectively. Numeral 605 denotes a guide block for regulating the moving directions of these moving blades 604a, 604b and 604c, and numeral 606a, 606b and 606c denote knockers for moving the respective moving blades 603 and they are pressed downward by, for example, the ram 610 of the cutting machine. The knockers 606a, 606b and 606c are fitted to the respective moving blades 603 on a taper surfaces, respectively. Numeral 607 denotes return springs of each of the moving blades 603. The heights of the knockers 606a, 606b and 606c are sequentially lowered (or raised) with a step of ΔH, respectively.

Since the cutting apparatus of the present invention is arranged as described above, the section bars 601 are passed through the respective calipers 602a to 602c and 604a to 604c of the fixed blade 602 and the moving blades 603, thereafter the ram 610 of the shearing machine is lowered so as to sequentially press the knockers 606a, 606b and 606c downward. In FIG. 58, first, the left knocker 606a is pressed downward and the left section 601 is cut first thereby. Next, the middle knocker 606b is pressed downward and the second middle section 601 is cut. Finally, the right knocker 606c is pressed downward and the right section 601 is cut. Therefore, the shearing force required by the shearing machine is a force necessary to shear one section regardless of the number of the section bars, whereby the shearing capacity of the shearing machine can be reduced and an increase in size of the shearing machine can be reduced thereby.

As described above, according to the present invention, when a plurality of section bars are cut substantially at the same time using the fixed blade having the plurality of calipers formed in accordance with the cross-sectional shapes of the section bars and the plurality of moving blades having the similar calipers, respectively, the oblique motions of the respective moving blades are performed with a time lag. Accordingly, since it is sufficient for the shearing machine to be provided with a shearing force necessary to cut one section regardless of the number of section bars, an increase in size of the shearing machine can be avoided and productivity can be enhanced by equipment of a small scale.

What is claimed is:

1. A multiple section bars straightening/cutting system in a rolling mill, comprising:

a multiple strands straightening apparatus for straightening the multiple section bars;

an inlet side introduction pinch roller disposed downstream of the multiple strands straightening apparatus for clamping the section bars straightened by the multiple strands straightening apparatus and introducing the straightened section bars downstream;

a multiple traveling section bars cutting apparatus disposed downstream of the inlet side introduction pinch roller and having fixed blades and moving blades each including a plurality of calipers formed in accordance with cross-sectional shapes of the section bars for cutting the section bars while the section bars travel by obliquely moving the moving blades with respect to the section bars; and a rear surface tilting table disposed downstream of the multiple traveling section bars cutting apparatus, said rear surface tilting table having an outlet side introduction pinch roller for clamping the section bars, and tilting in a direction in which the blades are moved in synchronism with the movement of the blades.

2. A multiple bars straightening/cutting system according to claim 1, wherein the inlet side introduction pinch roller comprises two first rollers disposed apart from each other a predetermined distance in a direction in which the section bars flow and a one second roller interposed between the first rollers, wherein the section bars are clamped by the first rollers and the second roller.

3. A multiple bars straightening/cutting system according to claim 1, wherein the outlet side introduction pinch roller comprises two first rollers disposed apart from each other a predetermined distance in a direction in which the section bars flow and a one second roller interposed between the first rollers, wherein the section bars are clamped by the first rollers and the second roller.

4. A multiple bars straightening/cutting system according to claim 2, wherein the predetermined distance between the two first rollers is adjustable.

5. A multiple bars straightening/cutting system according to claim 3, wherein the predetermined distance between the two first rollers is adjustable.

6. A multiple bars straightening/cutting system according to claim 1, wherein the distance between the inlet side introduction pinch roller and the outlet side introduction pinch roller is set shorter than a length obtained by subtracting a distance the section bars travel until leading ends thereof are clamped by the outlet side introduction pinch roller after the leading ends of the section bars reach a position of the outlet side introduction pinch roller from a product length.

7. A multiple bars straightening/cutting system according to claim 2, further comprising a stopper for regulating a rolling draft of the second roller.

8. A multiple bars straightening/cutting system according to claim 3, further comprising a stopper for regulating a rolling draft of the second roller.

9. A multiple bars straightening/cutting system according to claim 1, wherein the section bars are clamped by the inlet side introduction pinch roller and transported to the multiple traveling section bars cutting apparatus before the section bars come off the multiple section bars straightening apparatus, and wherein the section bars are clamped by the outlet side introduction pinch roller when leading ends thereof are transported to a position of the outlet side introduction pinch roller, and thereafter the inlet side introduction pinch roller is released.

10. A multiple bars straightening/cutting system according to claim 1, wherein the rear surface tilting table includes a plurality of tilting direction regulating mechanisms capable of regulating a tilting direction in accordance with a moving direction of the blades of the multiple traveling section bars cutting apparatus, and wherein the plurality of tilting direction regulating mechanisms are replaceable in accordance with the moving direction of the blades.

11. A multiple bars straightening/cutting system according to claim 1, wherein each of the fixed blades comprise at least two blades forming one of the plurality of calipers, and wherein the two blades of each of the fixed blades are arranged so as to be relatively movable so that the section bars are cut by the moving blades after the section bars are clamped by the two blades of the fixed blades.

12. A multiple bars straightening/cutting system according to claim 1, wherein clearances of the calipers are set such that cutting of respective portions of the section bars is finished simultaneously.

* * * * *